(12) United States Patent
Misawa

(10) Patent No.: US 7,492,412 B2
(45) Date of Patent: Feb. 17, 2009

(54) SOLID-STATE IMAGE PICKUP APPARATUS REDUCING RECORD DATA WITH REPRODUCTION IMAGE QUALITY MAINTAINED HIGH AND A METHOD FOR THE SAME

(75) Inventor: Takeshi Misawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 805 days.

(21) Appl. No.: 11/047,568

(22) Filed: Feb. 2, 2005

(65) Prior Publication Data

US 2005/0179794 A1   Aug. 18, 2005

(30) Foreign Application Priority Data

Feb. 3, 2004   (JP)   .............. 2004-026226

(51) Int. Cl.
| H04N 5/238 | (2006.01) |
| H04N 3/14 | (2006.01) |
| H04N 5/335 | (2006.01) |
| H04N 5/232 | (2006.01) |
| H04N 5/235 | (2006.01) |
| H04N 9/68 | (2006.01) |

(52) U.S. Cl. .............. 348/364; 348/275; 348/315; 348/230.1; 348/237

(58) Field of Classification Search .............. 348/222.1, 348/241, 272, 275, 364, 349, 229.1, 230.1, 348/234, 236, 281, 282, 283, 294, 295, 296, 348/298, 299, 300, 301, 302, 303, 304, 305, 348/306, 307, 308, 309, 310, 311, 312, 313, 348/314, 315, 316, 317, 318, 319, 320, 321, 348/322, 323, 324

See application file for complete search history.

(56) References Cited

U.S. PATENT DOCUMENTS

| 4,989,060 | A | * | 1/1991 | Usui | .................... | 257/223 |
| 6,211,915 | B1 | * | 4/2001 | Harada | .................... | 348/298 |
| 6,236,434 | B1 | | 5/2001 | Yamada | | |
| 6,282,462 | B1 | * | 8/2001 | Hopkins | .................... | 700/259 |
| 6,809,761 | B1 | | 10/2004 | Tamaru | | |
| 6,831,692 | B1 | * | 12/2004 | Oda | .................... | 348/315 |
| 6,982,759 | B2 | * | 1/2006 | Goto | .................... | 348/302 |
| 2002/0057903 | A1 | | 5/2002 | Kubo | | |

FOREIGN PATENT DOCUMENTS

| JP | 09205589 A | * | 8/1997 |
| JP | 2001-8104 | | 1/2001 |

* cited by examiner

Primary Examiner—Ngoc-Yen T. Vu
Assistant Examiner—Peter Chon
(74) Attorney, Agent, or Firm—McGinn IP Law Group, PLLC

(57) ABSTRACT

A solid-state image pickup apparatus includes a low-sensitivity decision section made up of an arithmetic circuit and a data decision circuit. During RAW mode recording operation, the arithmetic circuit executes sensitivity correction on low-sensitivity pixel data. The data decision circuit compares the low-sensitivity pixel data thus corrected with high-sensitivity pixel data to thereby produce map data pixel by pixel. Subsequently, pixel data are omitted on the basis of an embedding condition assigned to basic data set beforehand and the map data, whereby recording data a regenerated. The recording data are then recorded in a recording medium together with the map data and high-sensitivity pixel data.

39 Claims, 14 Drawing Sheets

| 0 | 2047 | 4095 | 4095 | 4095 | 4095 | 4095 | 4095 |
|---|---|---|---|---|---|---|---|
| 0 | 511 | 1023 | 1535 | 2047 | 2559 | 3071 | 3583 | 4095 |
| 0 | 2047 | 4095 | 4095 | 4095 | 4095 | 4095 | 4095 |
| 0 | 511 | 1023 | 1535 | 2047 | 2559 | 3071 | 3583 | 4095 |
| 0 | 2047 | 4095 | 4095 | 4095 | 4095 | 4095 | 4095 |
| 0 | 511 | 1023 | 1535 | 2047 | 2559 | 3071 | 3583 | 4095 |
| 0 | 2047 | 4095 | 4095 | 4095 | 4095 | 4095 | 4095 |
| 0 | 511 | 1023 | 1535 | 2047 | 2559 | 3071 | 3583 | 4095 |
| 0 | 2047 | 4095 | 4095 | 4095 | 4095 | 4095 | 4095 |
| 0 | 511 | 1023 | 1535 | 2047 | 2559 | 3071 | 3583 | 4095 |
| 0 | 2047 | 4095 | 4095 | 4095 | 4095 | 4095 | 4095 |
| 0 | 511 | 1023 | 1535 | 2047 | 2559 | 3071 | 3583 | 4095 |

Fig. 6A

| 0 | 2047 | 4095 | 4095 | 4095 | 4095 | 4095 | 4095 |
|---|---|---|---|---|---|---|---|
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |

| 0 | 511 | 1023 | 1535 | 2047 | 2559 | 3071 | 3583 | 4095 |
|---|---|---|---|---|---|---|---|---|
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |

Fig. 7

| 0 | 2044 | 4092 | 6140 | 8188 | 10236 | 12284 | 14332 | 16380 |
|---|------|------|------|------|-------|-------|-------|-------|
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |

| 0 | 2047 | 4095 | 4095 | 4095 | 4095 | 4095 | 4095 |
|---|------|------|------|------|------|------|------|
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |
| 0 | 2047 | 4095 | 4095 | 4095 | 4095 | 4095 | 4095 |

| 1535 | 2047 | 2559 | 3071 | 3583 | 4095 |
|------|------|------|------|------|------|
| 1535 | 2047 | 2559 | 3071 | 3583 | 4095 |
| 1535 | 2047 | 2559 | 3071 | 3583 | 4095 |
| 1535 | 2047 | 2559 | 3071 | 3583 | 4095 |
| 1535 | 2047 | 2559 | 3071 | 3583 | 4095 |
| 1535 | 2047 | 2559 | 3071 | 3583 | 4095 |

| 0 | 0 | 0 | 1 | 1 | 1 | 1 | 1 | 1 |
|---|---|---|---|---|---|---|---|---|
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |

Fig. 9

| 0 | 511 | 1023 | 1535 | 2047 | 2559 | 3071 | 3583 | 4095 |
|---|-----|------|------|------|------|------|------|------|
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |

160

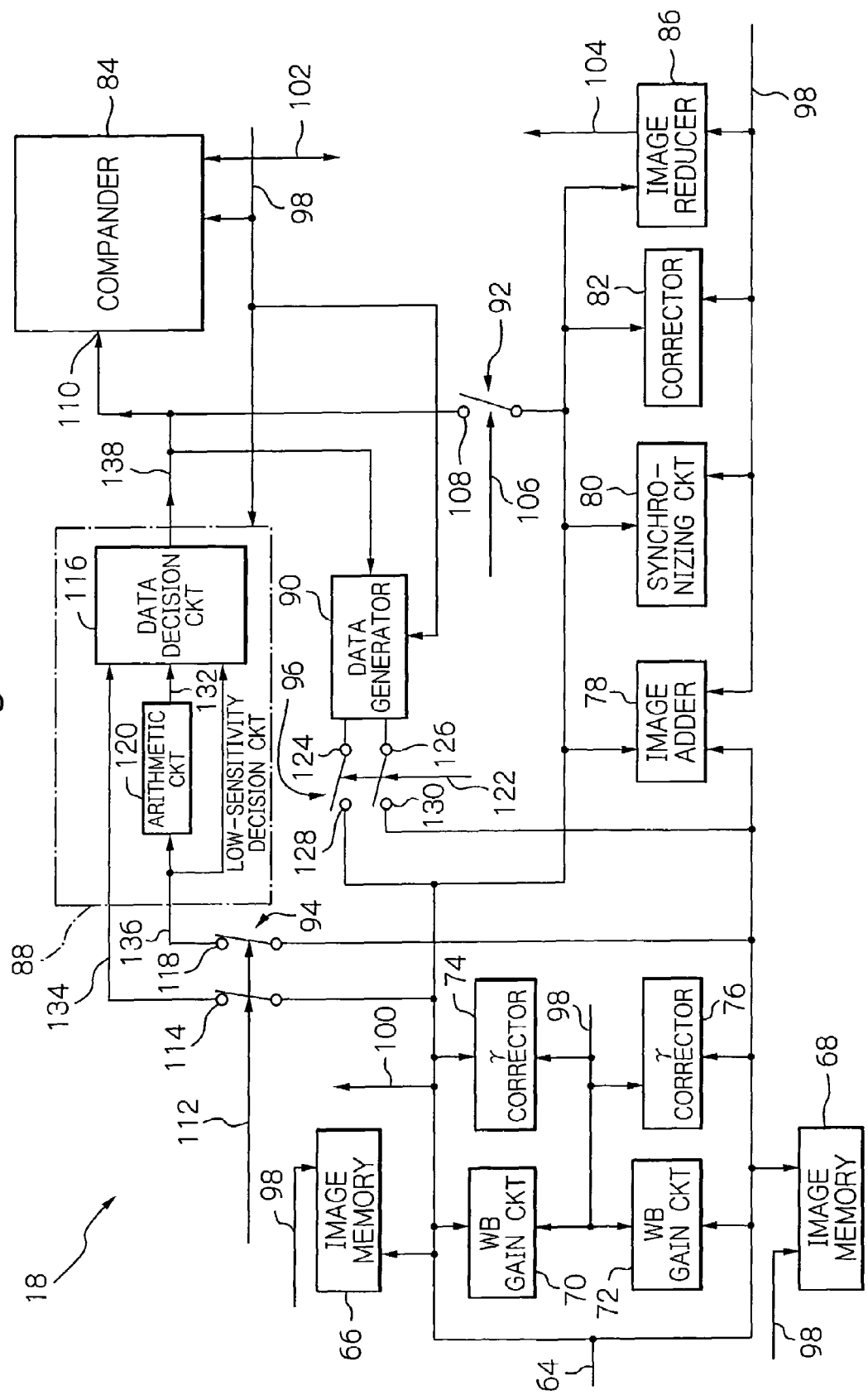

Fig. 11A

| | 136 | | | | | | | |
|---|---|---|---|---|---|---|---|---|
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |
| 0 | 511 | 1023 | 1535 | 2047 | 2559 | 3071 | 3583 | 4095 |

Fig. 11B

| | 162 | | | | | | | |
|---|---|---|---|---|---|---|---|---|
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |
| 0 | 2044 | 4092 | 6140 | 8188 | 10236 | 12284 | 14332 | 16380 |

Fig. 11C

| | 164 | | | | | | | |
|---|---|---|---|---|---|---|---|---|
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |

Fig. 12A

| 0 | 2047 | 4095 | 1535 | 2047 | 2559 | 3071 | 3583 | 4095 |
|---|------|------|------|------|------|------|------|------|
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |

Fig. 12B

| 0 | 0 | 0 | 1 | 1 | 1 | 1 | 1 | 1 |
|---|---|---|---|---|---|---|---|---|
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |

| 0 | 2047 | 4095 | 1535 | 2047 | 2559 | 3071 | 3583 | 4095 |
|---|------|------|------|------|------|------|------|------|
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |

| 0 | 2047 | 4095 | 4065 | 6141 | 7677 | 9213 | 10749 | 12285 |
|---|------|------|------|------|------|------|-------|-------|
| 0 | 2047 | 4095 | 4065 | 6141 | 7677 | 9213 | 10749 | 12285 |
| 0 | 2047 | 4095 | 4065 | 6141 | 7677 | 9213 | 10749 | 12285 |
| 0 | 2047 | 4095 | 4065 | 6141 | 7677 | 9213 | 10749 | 12285 |
| 0 | 2047 | 4095 | 4065 | 6141 | 7677 | 9213 | 10749 | 12285 |
| 0 | 2047 | 4095 | 4065 | 6141 | 7677 | 9213 | 10749 | 12285 |

Fig. 14

| 0 | 2047 | 4095 | 4095 | 4095 | 4095 | 4095 | 4095 | 4095 |
|---|---|---|---|---|---|---|---|---|
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |

| 0 | 0 | 0 | 1 | 1 | 1 | 1 | 1 | 1 |
|---|---|---|---|---|---|---|---|---|
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |
| 0 | 0 | 0 | 1 | 1 | 1 | 1 | 1 | 1 |

Fig. 15B (168)

| 0 | 2047 | 4095 | 1535 | 2047 | 2559 | 3071 | 3583 | 4095 |
|---|---|---|---|---|---|---|---|---|
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |
| 0 | 2047 | 4095 | 1535 | 2047 | 2559 | 3071 | 3583 | 4095 |

Fig. 15C

| 0 | 512 | 1024 | 1535 | 2047 | 2559 | 3071 | 3583 | 4095 |
|---|---|---|---|---|---|---|---|---|
| 0 | 512 | 1024 | 1535 | 2047 | 2559 | 3071 | 3583 | 4095 |
| 0 | 512 | 1024 | 1535 | 2047 | 2559 | 3071 | 3583 | 4095 |
| 0 | 512 | 1024 | 1535 | 2047 | 2559 | 3071 | 3583 | 4095 |
| 0 | 512 | 1024 | 1535 | 2047 | 2559 | 3071 | 3583 | 4095 |
| 0 | 512 | 1024 | 1535 | 2047 | 2559 | 3071 | 3583 | 4095 |

Fig. 16A

| 0 | 2047 | 4095 | 4095 | 4095 | 4095 | 4095 | 4095 | 4095 |
|---|------|------|------|------|------|------|------|------|
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |

Fig. 16B

| 0 | 512 | 1023 | 1535 | 2047 | 2559 | 3071 | 3583 | 4095 |
|---|-----|------|------|------|------|------|------|------|
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |

Fig. 16C

| 0 | 2047 | 1023 | 1535 | 2047 | 2559 | 3071 | 3583 | 4095 |
|---|------|------|------|------|------|------|------|------|
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |

Fig. 16D

| 0 | 0 | 1 | 1 | 1 | 1 | 1 | 1 | 1 |
|---|---|---|---|---|---|---|---|---|
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |

Fig. 17A

| 0 | 2047 | | | | 174 | | | |
|---|------|--|--|--|-----|--|--|--|
| 0 | 2047 | | | | | | | |
| 0 | 2047 | | | | | | | |
| 0 | 2047 | | | | | | | |
| 0 | 2047 | | | | | | | |
| 0 | 2047 | | | | | | | |

Fig. 17B

| 0 | 2047 | 4095 | 4095 | 4095 | 4095 | 4095 | 4095 | 4095 |
|---|------|------|------|------|------|------|------|------|
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |
| 0 | 2047 | 4095 | 4095 | 4095 | 4095 | 4095 | 4095 | 4095 |

Fig. 18A

| 0 | 2047 | 1023 | 1535 | 2047 | 2559 | 3071 | 3583 | 4095 |
|---|------|------|------|------|------|------|------|------|
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |
| 0 | 2047 | 1023 | 1535 | 2047 | 2559 | 3071 | 3583 | 4095 |

Fig. 18B

| 0 | 0 | 1 | 1 | 1 | 1 | 1 | 1 | 1 |
|---|---|---|---|---|---|---|---|---|
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |
| 0 | 0 | 1 | 1 | 1 | 1 | 1 | 1 | 1 |

Fig. 18C

| 0 | 512 | 1023 | 1535 | 2047 | 2559 | 3071 | 3583 | 4095 |
|---|-----|------|------|------|------|------|------|------|
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |
| 0 | 512 | 1023 | 1535 | 2047 | 2559 | 3071 | 3583 | 4095 |

SOLID-STATE IMAGE PICKUP APPARATUS REDUCING RECORD DATA WITH REPRODUCTION IMAGE QUALITY MAINTAINED HIGH AND A METHOD FOR THE SAME

BACKGROUND OF THE INVENTION

1. Field of the Invention

The present invention relates to a solid-state image pickup apparatus, and more particularly to a solid-state image pickup apparatus configured to record, in the form of image data, raw or unprocessed data derived from light incident to a single photo-sensitive cell or pixel or a photo-sensitive cell having a plurality of photo-sensitive regions different insensitivity from each other.

Further, the present invention relates to an image recording and an image reproducing method for such a solid-state image pickup apparatus, and more particularly to a method of "RAW mode" recording image data in the form of raw data and of reproducing image data adaptively to the RAW mode recording.

2. Description of the Background Art

Today, a digital camera using a solid-state image sensor is extensively used because it has the advantage of picking up images with high picture quality and allowing the user of the camera to easily monitor images picked up. Further, an advanced digital camera is directed toward picture quality comparable with one achievable with a camera using a silver-halide photosensitive type of film. A digital camera and a camera using a silver-halide photosensitive type of film are different from each other in dynamic range available, among others. More specifically, the dynamic range of a digital camera is narrower than a dynamic range achievable with a broad latitude particular to a silver-halide photosensitive type of film. Some different schemes have heretofore been proposed to enhance the dynamic range of a digital camera, as will be described hereinafter.

U.S. Pat. No. 6,809,761 to Masaya Tamura, for example, discloses an image data forming apparatus including a range separator. The range separator divides the entire dynamic range of image signals into a first range subject to gradation conversion and a second range covering the rest so as to establish a thus adjusted complete image on a reproduction system provided with preselected lightness and tone, while preserving the compatibility of the image signals with existing image files. In this configuration, the image components or video signals, each belonging to one of the two ranges, are recorded in a recording medium together while being related to each other. This allows the image components constituting a single image in combination, but belonging to the different ranges, to be effectively used in matching relation to a display medium for reproduction, thereby accomplishing image reproduction adaptive to the dynamic ranges for displaying on monitors and reproducing prints through, e.g. photosensitive films.

Japanese patent laid-open publication No. 2001-8104 proposes abroad dynamic range, image pickup apparatus including a CCD (Charge Coupled Device) solid-state image pickup device made up of high- and low-photosensitivity cells. Signal charges output from the high- and low-sensitivity cells are converted to corresponding analog signals and then digitized by respective analog-to-digital (A/D) converters. The resulting high- and low-sensitivity video signal data are recorded in a recording medium while being related to each other. With the simple configuration, according to the above publication document, the apparatus implements correction matching with reproduction or similar post-processing to thereby provide an image with a dynamic range as broad as achievable with silver-halide photosensitive type of films. In addition, this apparatus is capable of reducing the amount of data to be written into a recording medium.

Further, U.S. patent publication No. US 2002/0057903 A1 teaches an image data recording apparatus that allows even an apparatus provided with a fixed quantization level to effectively use all data of an image picked up in a broad range. Specifically, the data recording apparatus taught in the above publication document includes a digital signal processor configured to process a video signal fed from an analog-to-digital converter through its consecutive stages. More specifically, the digital signal processor produces a difference of a signal output in each of its processing stages from a signal output just before that stage for thereby feeding eight-bit data specific to a complete image file. At the same time, the digital signal processor records parameters representative of the processing history and the difference data in a sub-file while relating them to each other, i.e. records the data in a standard file format. This allows original data of an image picked up to be fully reproduced and effectively used. The prior art disclosed in the documents thus attains a broad dynamic range for image recording so far.

There is an increasing demand for a digital camera with picture quality high enough to differentiate itself from a digital imaging function available with a modern cellular phone. While higher picture quality is achievable if the number of pixels is increased, an increase in the number of pixels results in a decrease in the photosensitive area of the individual photo-sensitive cell or image sensing device. Also, a solid-state image pickup apparatus generally has a problem that false signals including moiré appear, depending on a subject picked up.

To reduce false colors ascribable to false signals and broaden the dynamic range while promoting efficient receipt of light, U.S. Pat. Pat. No. 6,236,434 to Tetsuo Yamada discloses a solid-state image pickup device in which pixels are highly integrated to increase the quantity of incident light available. For this purpose, assuming that the distance between pixels on the same row or the same column is a pitch, then in the above apparatus pixels are shifted by half a pitch in the direction of row and/or the direction of column in a so-called honeycomb pattern. Further, the photosensitive area of the individual photo-sensitive cell includes a main region and a sub-region smaller in size than the main region, so that signal charges can be read out from the two regions either separately or at the same time.

Generally, with a digital camera available is a "RAW mode" in which entire raw data produced by a shot are recorded, in addition to a usual mode that records data in only a preselected number of pixels. The RAW mode is advantageous in that image processing can be repeated any number of times with the raw data after a shot until a desired image has been achieved, compared to other modes in which image data are non-reversibly produced by image processing made at the time of a shot. In the RAW mode recording, pixel data corresponding in number to at least the effective pixels of a solid-state image sensor are produced as raw data. More specifically, the solid-state image pickup device disclosed by the U.S. patent to Yamada mentioned earlier handles two times greater number of pixels than the CCD solid-state image pickup device of Japanese patent laid-open publication No. 2001-8104.

While semiconductor memories with its storage capacity as great as several hundred megabytes to one gigabyte are available on the market as recording media, such memories are expensive. An inexpensive semiconductor memory, however, soon becomes short of capacity when image data are recorded in the RAW mode, and therefore noticeably reduces the number of images that can be stored. Moreover, RAW mode recording extends recording time and aggravates power consumption.

SUMMARY OF THE INVENTION

It is an object of the present invention to provide a solid-state image pickup apparatus capable of picking up an image with both high- and low-photosensitivity at the same time and efficiently recording the resulting pixel data, and an image recording method for the same.

It is another object of the present invention to provide a solid-state image pickup apparatus capable of restoring substantially the entire image data efficiently recorded, and an image reproducing method for the same.

A solid-state image pickup apparatus of the present invention includes a solid-state image sensor including an array of photo-sensitive cells bi-dimensionally arranged, each of the photosensitive cells including a main region and a sub-region smaller in sensitivity than the main region for converting incident light to a corresponding signal charge. A signal processor reads out signal charges generated in the photo-sensitive cells, and executes signal processing on pixel data represented by the signal charges. Pixel data output from the signal processor are recorded in a recording medium. The signal processor includes a RAW data reducing circuit configured to compress, in the RAW mode, at least one of high- and low-sensitivity pixel data output from the main and sub-regions, respectively. Further, the RAW data reducing circuit includes an arithmetic circuit configured to multiply the low-sensitivity pixel data by a predetermined sensitivity correction coefficient that makes the sensitivity of the low-sensitivity pixel data identical with the sensitivity of the high-sensitivity pixel data. A data decision circuit compares a product output from the arithmetic circuit with the high-sensitivity pixel data, uses either one of the high- and low-sensitivity pixel data as basic data, and omits and embeds pixel data in accordance with an embedding condition for embedding processed data in the basic data to generate the recording data.

An image recording method and an image reproducing method applicable to the above image pickup apparatus are also disclosed.

BRIEF DESCRIPTION OF THE DRAWINGS

The objects and features of the present invention will become more apparent from consideration of the following detailed description taken in conjunction with the accompanying drawings in which:

FIG. 5 shows specific pixel data output when given light is incident to the photo-sensitive cells of the image pickup section;

FIGS. 6A and 6B respectively show high- and low-photosensitivity pixel data stored in image memories included in the signal processor of FIG. 3;

FIG. 7 shows specific values resultant from multiplying the low-sensitivity pixel data by a preselected photosensitivity correction coefficient by an arithmetic circuit included in the circuitry of FIG. 3;

FIGS. 8A, 8B and 8C respectively show high- and low-sensitivity pixel data and map data output from the signal processor of FIG. 3 in the RAW mode;

FIG. 9 shows low-sensitivity pixel data restored on the basis of the high-sensitivity pixel data and map data of FIG. 8;

FIG. 10 is a schematic block diagram showing another specific configuration of the signal processor included in the illustrative embodiment;

FIGS. 11A, 11B and 11C show data input to a low-sensitivity decision section included in the circuitry of FIG. 10 and data produced in accordance with a specific procedure of the decision section;

FIGS. 12A and 12B respectively show record data and map data generated by the low-sensitivity decision section;

FIGS. 13A and 13B show the results of arithmetic operations effected with the record data on the basis of the record data and map data;

FIG. 14 shows high-sensitivity pixel data restored on the basis of the values shown in FIGS. 13A and 13B;

FIGS. 15A and 15B respectively show record data and map data produced by the circuitry of FIG. 10;

FIG. 15C shows low-sensitivity pixel data restored on the basis of the data shown in FIGS. 15A and 15B;

FIGS. 16A, 16B, 16C and 16D show data input to the low-sensitivity decision section of FIG. 10 and data produced in accordance with another specific procedure of the above section;

FIGS. 17A and 17B respectively show interim data derived from record data shown in FIG. 16 and restored high-sensitivity pixel data;

FIGS. 18A and 18B respectively show record data and map data of FIG. 16; and FIG. 18C show low-sensitivity pixel data restored on the basis of such data.

DESCRIPTION OF THE PREFERRED EMBODIMENTS

Figure 1:
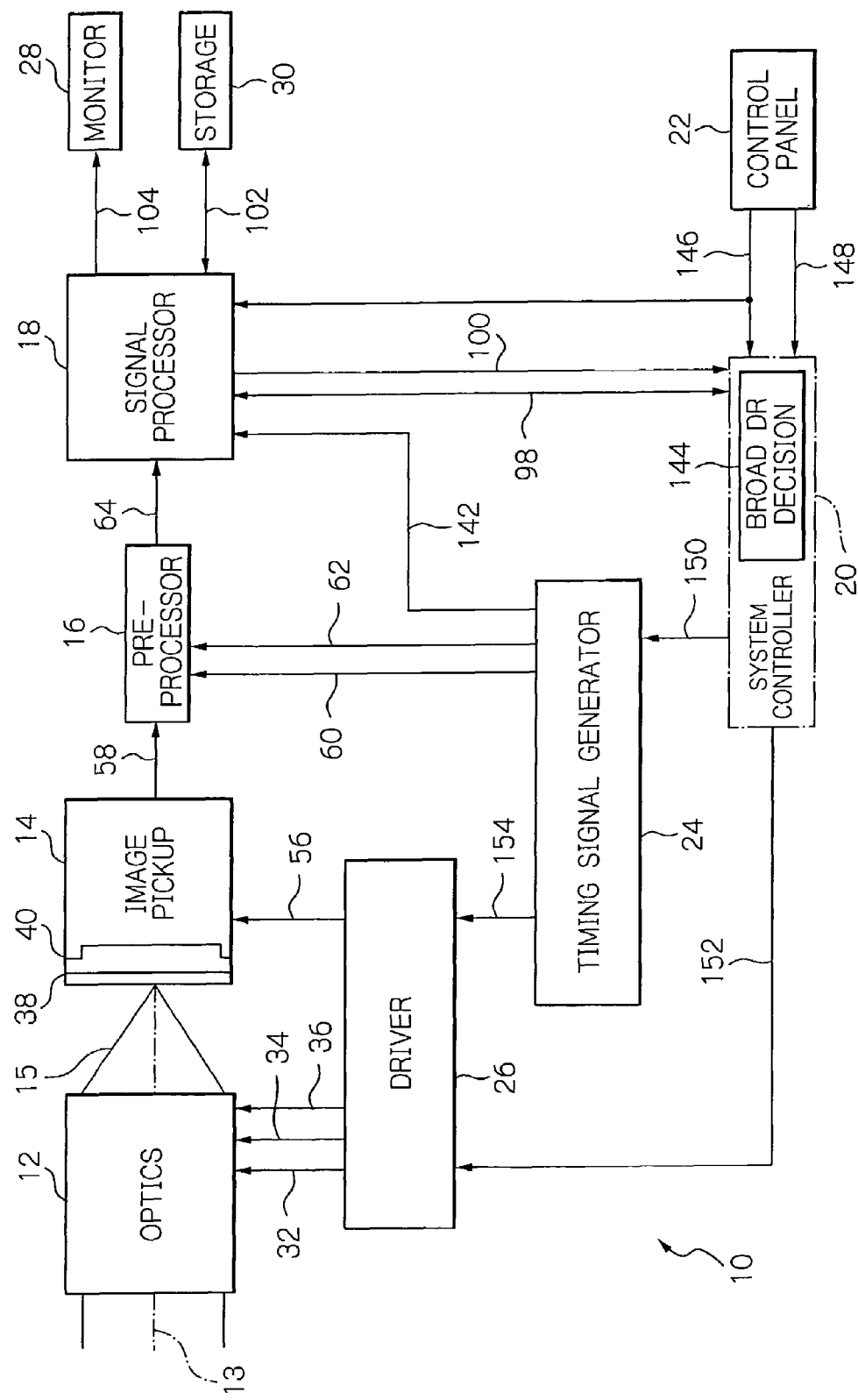
FIG. 1 is a schematic block diagram showing a preferred embodiment of the solid-state image pickup apparatus in accordance with the present invention and implemented as a digital camera by way of example.

Referring to FIG. 1 of the drawings, a solid-state image pickup apparatus embodying the present invention is implemented as a digital camera by way of example. Circuit arrangements not directly relevant to the understanding of the present invention are not shown in FIG. 1 and will not be described specifically.

As shown in FIG. 1, the digital camera, generally 10, includes optics 12, an image pickup section 14, a preprocessor 16, a signal processor 18, a system controller 20, a control panel 22, a timing signal generator 24, a driver 26, a monitor 28 and a storage 30, which are interconnected as illustrated. The optics 12 includes a plurality of lenses, a zoom mechanism, a diaphragm control mechanism and an AF (Automatic Focus) control mechanism although not shown specifically.

The zoom mechanism adjusts the angle of viewing an imaging field while the AF control mechanism automatically translates the lenses on the optical axis 13 to a positional relation that focuses the camera 10 on a desired subject. The zoom and AF control mechanisms are provided with a respective motor configured to shift the above lenses in response to a drive signal 32 output from the driver 26.

The diaphragm mechanism, or AE (Automatic Exposure) control mechanism, for controlling the quantity of incident light 15, includes a ring portion, not shown, rotatable in response to a drive signal 34 also output from the driver 26. More specifically, the ring portion includes a plurality of blades that partially overlap each other to form a substantially circular diaphragm, or iris diaphragm, having its radius variable. The diaphragm mechanism may, if desired, be implemented by a mechanical shutter assembled in the lenses as the function of a lens shutter.

A mechanical shutter screens the image pickup section 14 from light except for the time of image pickup or shooting, and defines an exposure period of time from the start to the end of exposure. The mechanical shutter may be implemented as a focal-plane shutter customary with a single-lens reflex camera and configured to cause a shutter screen to run vertically or horizontally while instantaneously forming a slit for exposure. The focal-plane shutter may, of course, be replaced with the lens shutter stated above. In any case, the mechanical shutter selectively opens or closes in response to a drive signal 36 fed from the driver 26.

The image pickup section 14 includes an optic allow-pass filter 38 and a solid-state image sensor 40 including a color filter not shown. The optical low-pass filter 38 limits the spatial frequency of the light 15 incident thereto to the Nyquist frequency or below.

Figure 2:
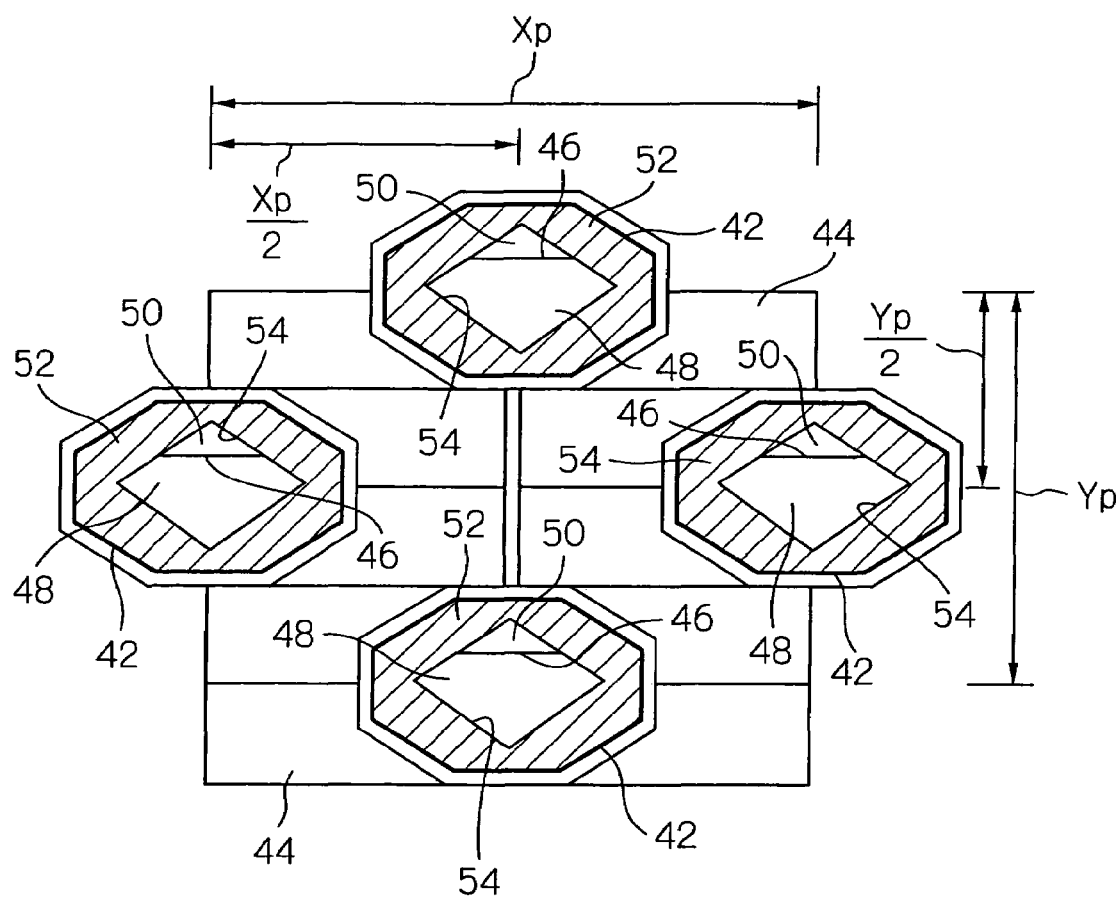
FIG. 2 schematically shows in a plan view part of photosensitive cells or image sensing devices arranged in an image pickup section included in the illustrative embodiment.

FIG. 2 shows part of the solid-state image sensor 40 in detail. As shown, the image sensor 40 includes photo-sensitive cells or image sensing devices 42 implemented by CCDs (Charge Coupled Devices) and densely arranged in rows and columns. More specifically, the photo-sensitive cells 42 on the same row are arranged at a pixel pitch of $X_P$ while the photo-sensitive cells 42 on the same column are arranged at a pixel pitch of $Y_P$. Further, the photo-sensitive cells 42 adjacent to each other in the direction of row and the photo-sensitive cells 42 adjacent to each other in the direction of column are arranged at pixel pitches of $X_P/2$ and $Y_P/2$, respectively. Vertical transfer registers 44 are formed between the photo-sensitive cells 42 thus shifted from each other in such a manner as to skirt around the photo-sensitive cells 42.

Each photo-sensitive cell 42 has an octagonal photosensitive area including a main region 48 and a sub-region 50, which is smaller in area than, and separated by a divider 46 from, the main region 48. A screening film 52 is formed on the peripheral portion of the photo-sensitive cell 42 indicated by hatching in FIG. 2 in such a manner as to partially cover the peripheral area of the photosensitive cell 42. An aperture 54 is formed in the central area of the screening film 52 in order to pass part of the incident light 15 therethrough. The screening film 52 is so configured as to fully screen the vertical transfer registers 44 as well from light, although not shown specifically to avoid complexity. In the illustrative embodiment, the main region 48 and sub-region 50, constituting the photosensitive area of a pixel in combination, are provided with the respective photo-sensitivities dependent upon the area thereof.

As shown in FIG. 1, the image sensor 40 with the above configuration is driven by a drive signal 56 also output from the driver 26. The drive signal 56 includes field shift pulses, a horizontal drive signal φH, a vertical drive signal φV, an OFD (Over Flow Drain) signal and so forth, which are selectively output in accordance with the operation mode of the image sensor 40 and read-out control.

In the illustrative embodiment, the main region 48 and sub-region 50 are provided with respective field shift gates and electrodes, so that signal charges stored in the two different regions 48 and 50 can be read out independently of each other, although not shown specifically in FIG. 2. Field shift pulses are selectively fed to the electrodes of the main region 48 and sub-region 50 at the same timing or at different timings in accordance with read-out control. Field shift pulses fed to the two regions 49 and 50 at the same timing cause signal charges to be read out as if they were read out from a single photo-sensitive cell together. This read-out mode, which is an ordinary mode, will be referred to as a mixed read-out mode hereinafter. By contrast, field shift pulses fed to the regions 49 and 50 at different timings cause signal charges to be read out independently of each other. Let this read-out mode be referred to as an independent read-out mode hereinafter. An analog voltage signal 58 is output from the image sensor 40 in accordance with the above read-out control and input to the preprocessor 16.

It is to be noted that the image sensor 40 is configured such that in the independent read-out mode signal charges are read out from the main region 48 prior to from the sub-region 50, the main region 48 being more abrupt in attenuation of the saturation amount with the elapse of time than the sub-region 50. For this purpose, the image sensor 40 may be adapted such that signal charges stored in the two regions 48 and 50 of the individual photo-sensitive cell 42 are sequentially read out in the above order by interlacing.

Referring again to FIG. 1, the preprocessor 16 includes a CDS (Correlated Double Sampling) circuit, a gain-controlled amplifier (GCA) and an analog-to-digital converter (ADC) for canceling noise, although not shown specifically. CDS pulses 60 are fed from the timing signal generator 24 to the CDS circuit as a sampling signal while a conversion clock signal 62 is fed from the timing signal generator 24 to the analog-to-digital converter. The preprocessor 16 executes noise cancellation, wave shaping and digitization on the analog signal 58 input thereto from the image pickup section 14, and delivers all of the resulting data to the signal processor 18 in the form of digital image data 64.

Figure 3:
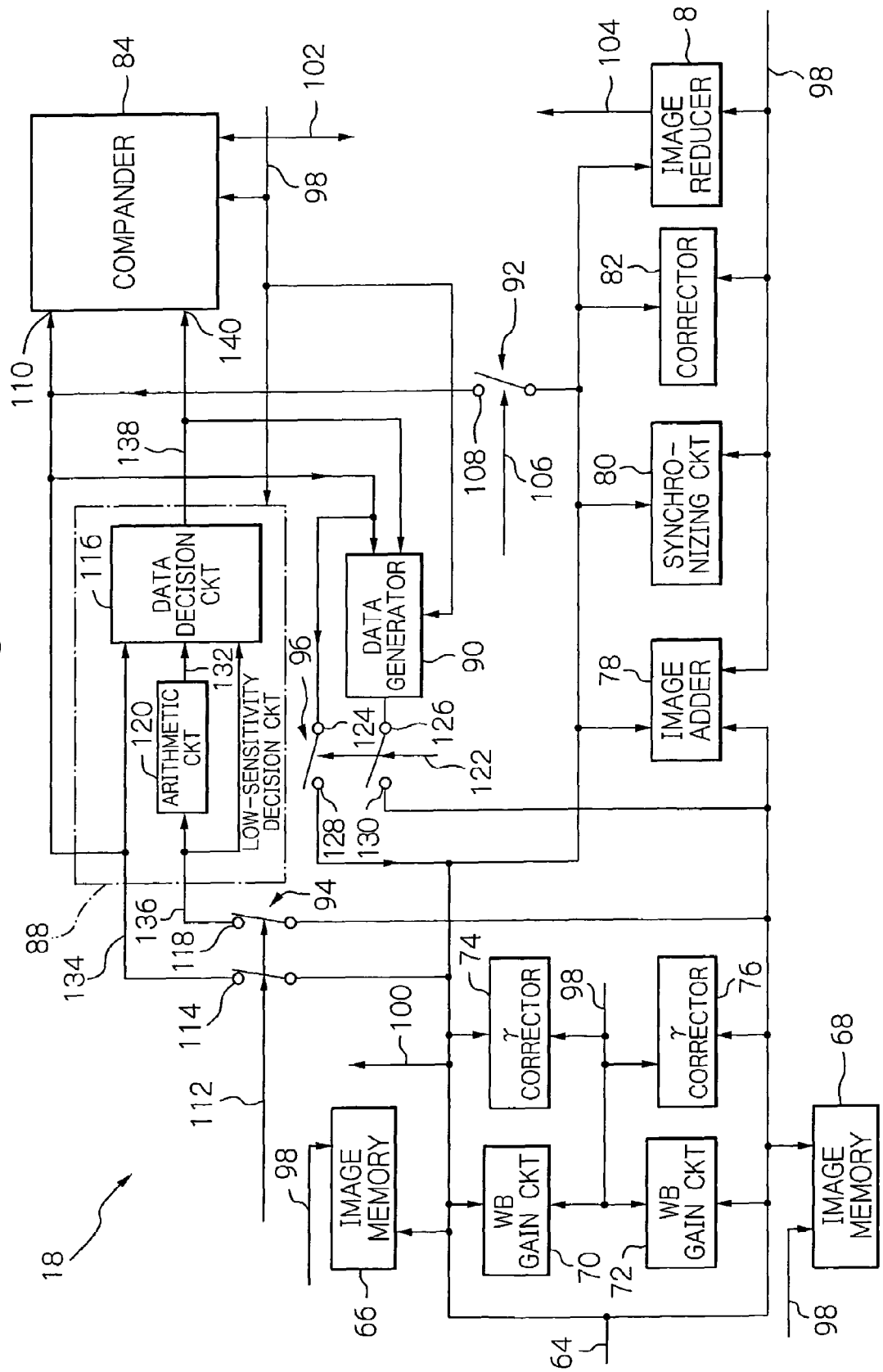
FIG. 3 is a schematic block diagram showing a specific configuration of a signal processor also included in the illustrative embodiment.

FIG. 3 shows a specific configuration of the signal processor 18. As shown, the signal processor 18 includes image memories 66 and 68, WB (White Balance) gain circuits 70 and 72, gamma correctors 74 and 76, an image adder 78, a synchronizing circuit 80, a corrector 82, a compander 84 and an image reducer 86, which are interconnected as shown for cooperating to broaden the dynamic range of the image data 64. Further, the signal processor 18 includes a low-photosensitivity decision section 88 and a data generator 90 that characterize the illustrative embodiment. Mode switches 92, 94 and 96 are arranged in the signal processor 18 and operated in accordance with the operation mode selected by the user of the digital camera 10. The mode switches 92, 94 and 96 may, of course, be omitted if the system controller 20 is adapted to output a control signal 98 to the signal processor 18 in such a manner as to cause the individual circuits to operate in accordance with an operation mode selected.

More specifically, the image memories 66 and 68 are implemented in the form of buffer memories. The image memories 66 and 68 should preferably be implemented by nonvolatile memories in the case where the same pixel data are repeatedly read out. The pixel data 64 are input to the image memories 66 and 68 and stored therein for a moment. The image memory 66, for example, is used as a high-sensitivity pixel memory configured to selectively store, when a single photo is taken, pixel data derived only from the main region 48 of each photo-sensitive cells 42 or mixed pixel data derived from both of the main region 48 and sub-region 50. The other image memory 68 is used as a low-sensitivity image memory for storing pixel data derived only from the sub-regions 50 of the photo-sensitive cells 42. The pixel data are selectively written into or read out from the image memories 66 and 68 in response to the control signal 98 output from the system controller 20. The signal processor 18 supplies the system controller 20 with, e.g. a status signal representative of its operating condition from the memories 66 and 68 or similar circuitry operative under the control of the system controller 20. The image memories 66 and 68 may also be controlled, as needed, in such a fashion that the pixel data are read out therefrom to reduce, or thin out, the pixels in consideration of the positions of the photo-sensitive cells 42 and the arrangement of filter colors.

The image memory 66 is connected to the WB gain circuit 70, gamma corrector 74, image adder 78, synchronizing circuit 80, corrector 82 and image reducer 86. The compander 84 is connected to the image memory 66 via the mode switch 92. The image memory 66 is connected to the low-sensitivity decision circuit 88 and compander 84 via the mode switch 94. The image memory 66 is configured to store, among the pixel data output from the compander 84, high-sensitivity pixel data fed via the mode switch 96.

The image memory 68 is connected to the WB gain circuit 72, gamma corrector 76 and image adder 78 and connected to the low-sensitivity decision section 88 via the mode switch 94 so as to feed low-sensitivity pixel data to the low-sensitivity decision section 88. The image memory 66 stores, among the pixel data output from the compander 84, low-sensitivity pixel data fed via the mode switch 96. The pixel data thus written into the image memories 66 and 68 are respectively fed to the WB gains circuits 70 and 72 in response to the control signal 98.

The WB gain circuits 70 and 72 execute white balance control and gain correction or compensation on the pixel data input thereto and deliver the resulting pixel data to the gamma correctors 74 and 76, respectively, under the control of the system controller 20. The gamma correctors 74 and 76 each use, e.g. a respective lookup table stored therein to execute gamma correction on the image data. More specifically, the gamma corrector 74 executes gamma correction under the control of the system controller 20 and feeds the image data thus processed to the image adder 78 and synchronizing circuit 80. Further, the gamma corrector 74 delivers the processed image data to the system controller 20 as pixel data 100. The gamma corrector 76 executes gamma correction and selectively feeds the image data thus processed to the image adder 78 or stops operating under the control of the system controller 20.

The image adder 78 adds or combine the input image data originating from each photo-sensitive cell 42 including the couple of regions 48 and 50 to form a pixel for there by broadening the dynamic range of the pixel data. The principle of dynamic range broadening unique to the illustrative embodiment will be briefly described with reference to FIG. 4, which shows a relation between the intensity of the incident light 15 and output data obtained from the photosensitive cells 42.

Figure 4:
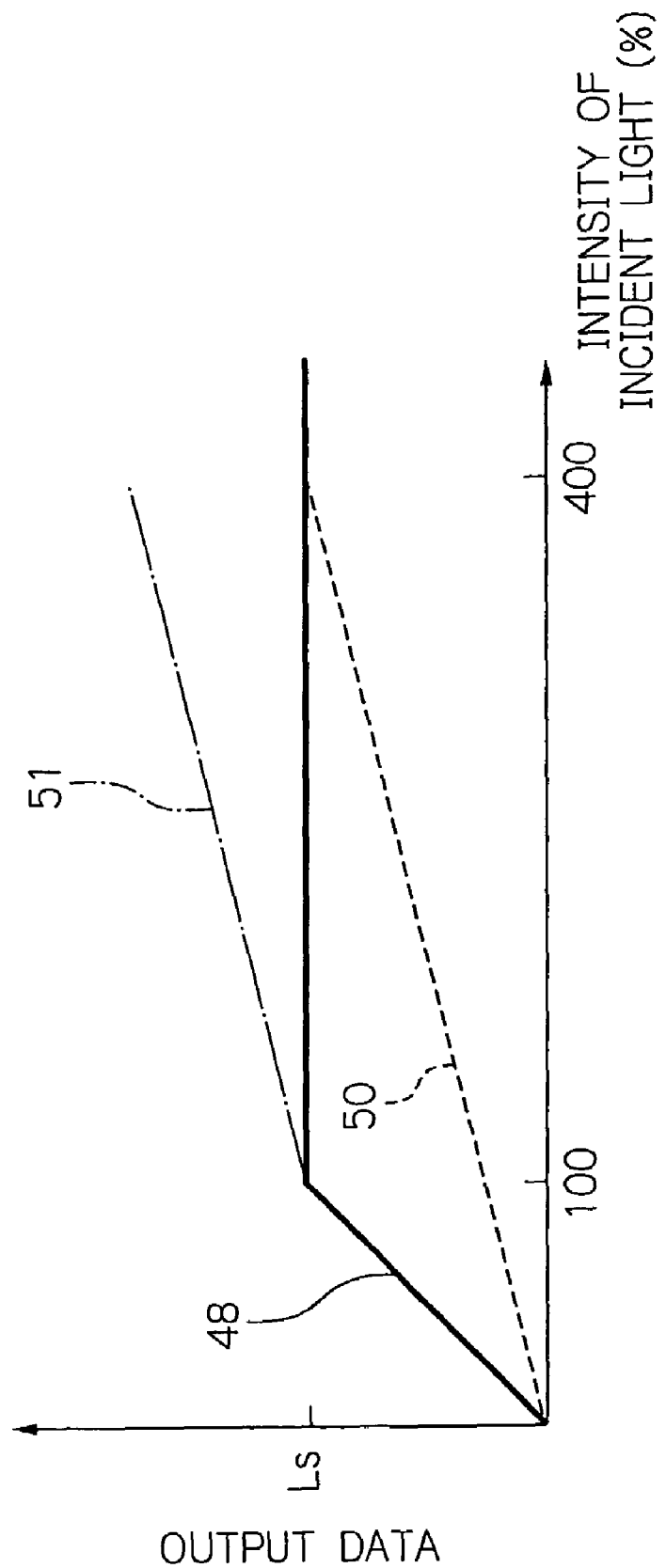
FIG. 4 is a graph useful for understanding a principle with which the signal processor of FIG. 3 broadens a dynamic range.

As shown in FIG. 4, when the intensity of the light 15 incident to the main region 48 is 100%, the output data reaches a saturation level Ls, as indicated by a solid line; the output data remains at the saturation level Ls even if the intensity of the light 15 increases above 100%. By contrast, the output data derived from the sub-region 50 does not reach the saturation level Ls until the intensity of the light 15 incident to the sub-region 50 increases to 400%, as indicated by a dotted line in FIG. 4. Therefore, the sensitivity ratio of the main region 48 to the sub-region 50 is 1:¼. The image adder 78 adds low-sensitivity pixel data over a range in which the output data saturates for an intensity of the incident light 15 of 100% or above, as indicated by a dash-and-dot line 51 in FIG. 4, thereby broadening the adaptive range of the intensity of the incident light 15. The image adder 78 delivers the result of addition to the synchronizing circuit 80 under the control of the system controller 20.

It will be seen that low-sensitivity pixel data can be compared with high-sensitivity pixel data with respect to the same sensitivity if quadrupled. This multiple will be referred to as a sensitivity correction coefficient matching with the area ratio of the main region 48 to the sub-region 50 of the individual photo-sensitive cell 42 unique to the illustrative embodiment.

The synchronizing circuit 80 is adapted to use the result of addition output from the image adder 78 to execute pixel interpolation and color interpolation. More specifically, the synchronizing circuit 80 interpolates data in virtual pixels, i.e. void portions inherent to the shifted arrangement of the photo-sensitive cells or real pixels 42. In this instance, the synchronizing circuit 80 may additionally be adapted to broaden the dynamic range of the pixel data thus generated. With the illustrative embodiment, having a single CCD image sensor with a three-primary color filter, the color interpolation serves to deal with only one of the three primary colors R (red), G (green) and B (blue) at a time for each pixel. The synchronizing circuit 80 is therefore adapted to generate pixel data associated with to the remaining two colors of each pixel, thereby preparing R, G and B for all of the pixels. Let this operation be referred to as synchronization. Pixel data thus generated by the synchronizing circuit 80 are input to the corrector 82 under the control of the system controller 20.

The corrector 82 executes various kinds of processing including color difference matrix processing, contour or edge enhancement and gain adjustment on the basis of plain three-color image data input thereto. In the color difference matrix processing by the corrector 82, the input pixel data and a predetermined coefficient are used to generate luminance data Y and color data Cb and Cr or color difference data (B-Y) and (R-Y). The corrector 82 then executes gradation correction, contour enhancement and gain adjustment on the above image data generated by color difference matrix processing. The resulting image data are fed to the compander 84 via the mode switch 92 under the control of the system controller 20.

In a photo or still picture mode or a movie mode selected on the digital camera 10 in the event of usual recording, the compander 84 uses a JPEG (Joint Photographic coding Experts Group), MPEG (Moving Picture coding Experts Group)-1, MPEG-2 or similar standard to compress the image data input thereto via the mode switch 92. By contrast, in the RAW mode also available with the digital camera 10, the compander 84 receives on its input port 140 data 138 indicative of whether or not deletion is allowable on either one of high- and low-sensitivity image data on the basis of the high- and low-sensitivity image data coming via the mode switch 94. Stated another way, the data input to the compander 84 show whether or not reproduction is possible. The data are map data represented by either one of (logical) Zero and (logical) ONE. In the RAW mode, raw record data to be recorded in the storage 30 may be subjected to reversible compression, as will be described more specifically later. Because the low-sensitivity decision circuit 88 reduces the amount of data in the RAW mode, the compander 84 should preferably simply pass the data 138 including the raw record data and map data therethrough to the storage 30. To compress the above map data, the compander 84 may use run-length coding by way of example.

As stated above, the compander 84 feeds the storage 30, FIG. 1, with image data 102 produced under the control of the system controller 20 according to the mode selected by the user and writes them into the storage 30. Subsequently, the compander 84 reads out the image data 102 from the storage 30 in accordance with the control of the system controller 20 and then expands the image data 102 if they are compressed. In this sense, expansion is an inverse process to compression stated above.

The image reducer 86 reduces, or thins out, input image data in consideration of the size of the image data for thereby matching them to the display screen size and format particular to the monitor 28, FIG. 1, under the control of the system controller 20. Image data 104 thus processed by the image reducer 86 are fed to the monitor 28, FIG. 1.

The mode switches 92, 94 and 96 included in the signal processor 18 will be described more specifically hereinafter. The mode switch 92 is turned on, or rendered conductive, in one of the record modes which allows image data broadened in dynamic range or produced in the mixed read-out mode to be received or in a playback mode in which image data recorded in the above record mode are output from the compander 84, while remaining turned off in the other modes. The mode switch 92 is turned on or off in response to a switching signal 106 output from the system controller 20 in accordance with the operation of the control panel 22. The mode switch 92 connects an output terminal 108 to the terminal 110 of the compander 84.

The mode switches 94 and 96 are synchronous switches operated to select either one of high- and low-sensitivity pixel data fed thereto at the same time. The mode switch 94 is turned on when the RAW mode is selected and otherwise turned off in response to a switching signal 112. The mode switch 94 transfers an input signal to the low-sensitivity decision section 88 when turned on. More specifically, the mode switch 94 has its output terminal 114 connected to a data decision circuit 116 included in the low-sensitivity decision section 88 and the terminal 110 of the compander 110, and has its output terminal 118 connected to an arithmetic circuit 120 also included in the data decision section 88 and data decision circuit 116.

The mode switch 96 is turned on when the RAW mode, which is a specific playback mode, is selected while remaining turned off in the other modes in response to a switching signal 122. The switching signal 122 should preferably be generated in accordance not only with the mode selected but also with whether or not map data, which will be described specifically later, indicative of the RAW mode are present. The mode switch 96 has its input terminals 124 and 126 connected to the terminal 110 of the compander 84 and the output of the data generator 90, respectively. In the circuitry shown in FIG. 3, the compander 84 delivers expanded data including high-sensitivity pixels to the data generator 90 via its output 110 together with map data. The mode switch 96 has its output terminal 128 and 130 both connected to the line to which the image data 64 are fed. Raw pixel data thus reproduced are delivered to the various sections of the signal processor 18 and then written into a circuit enabled by the control signal 98 and digitized thereby.

The low-sensitivity decision section 88, including the arithmetic circuit 120 and data decision circuit 116, will be described more specifically hereinafter. The arithmetic circuit 120 is loaded with, beforehand, data representative of the sensitivity correction coefficient for standardizing pixel data output from the main region 48 and sub-region 50 of the individual photo-sensitive cell 42, which is included in the image sensor 40. In the illustrative embodiment, the arithmetic circuit 120 multiplies low-sensitivity input pixel data by the sensitivity correction coefficient. The resulting product data 132 are fed from the arithmetic circuit 120 to the data decision circuit 116.

The data decision circuit 116 determines whether or not low-sensitivity pixel data unique to the illustrative embodiment should be converted to map data. To implement such a function of the data decision circuit 116, high-sensitivity pixel data 134, low-sensitivity pixel data 136 and the product data 132 are input to the data decision circuit 116. The data decision circuit 116 delivers the data 138 representative of the result of decision to, e.g. the input terminal 140 of the compander 84.

The high- and low-sensitivity pixel data 134 and 136, respectively, may not be input to the data decision circuit 116 at the same time. For example, the low-sensitivity pixel data 136 may be input a short period of time after the high-sensitivity pixel data, in which case a single input line suffices for both of the high- and low-sensitivity data. It follows that the input from the low-sensitivity decision section 88 to the compander 84 and the output from the compander 84 to the data generator 90 can be implemented by a single terminal 110. In such a case, the system controller 20 should preferably select and control necessary ones of the low-sensitivity decision section 88, compander 84 and data generator 90 in accordance with the short period of time mentioned above.

The decision of the data decision circuit 116 will be described in detail hereinafter. The data decision circuit 116 produces a difference between the high-sensitivity pixel data 134 and the product data 132, compares the absolute value of the difference or the difference itself for simplicity with a predetermined threshold value, which is used to select ONE or ZERO as map data.

More specifically, if the absolute value mentioned above is greater than the threshold value, then the data decision circuit 116 determines that the subject pixel data are unable to be reproduced, sets map data ONE for the subject pixel data, and delivers the low-sensitivity pixel data 136 to the terminal 140 of the compander 84. By contrast, if the absolute value is equal to or smaller than the threshold value, the data decision circuit 116 sets map data ZERO for the subject pixel data to thereby omit the low-sensitivity pixel data 136, so that only the map data ZERO is fed to the terminal 140 of the compander 84. At this instant, high-sensitivity pixel data 134, corresponding to the above low-sensitivity pixel data 136, are fed to the compander 84.

The data generator 90 has one of its playback functions which reproduces data derived from data recorded in the RAW mode. More specifically, in the illustrative embodiment, the data generator 90 divides expanded high-sensitivity pixel data with map data ZERO by the sensitivity ratio assigned to the individual photo-sensitive cell 42 of the image sensor 40. The data generator 90 then outputs data representative of the resulting quotient as low-sensitivity pixel data. On the other hand, when map data ONE is input, the data generator 90 outputs low-sensitivity pixel data corresponding in position to the map data ONE. Various reproducing methods available with the illustrative embodiment will be described specifically later.

As shown in FIGS. 1 and 3, the control signal 98 mentioned earlier is applied from the system controller 20 to the signal processor 18. A signal generator, not shown, included in the signal processor 18 also operates in response to the control signal 98. The signal generator includes a VCO (Voltage Controlled Oscillator) and a PLL (Phase Locked Loop) circuit, not shown. The PLL circuit multiplies the oscillation frequency of the VCO circuit, i.e. a reference clock for thereby generating a plurality of different frequencies. A clock signal thus output from the signal generator is fed to the system controller 20 and timing signal generator 24, although not shown specifically.

The signal processor 18 is, on the other hand, supplied with a timing signal 142 from the timing signal generator 24. The timing signal 142 includes a horizontal synchronous signal HD, a vertical synchronous signal VD and clock signals to be applied to the various sections of the digital camera 10, as will be described specifically later.

Referring again to FIG. 1, the system controller 20 is implemented as a microcomputer or comprises a CPU (Central Processing Unit) configured to generally control the sections of the digital camera 10 and the sections adapted for performing digital processing. More specifically, the system controller 20 includes a broad dynamic range (DR) decision circuit 144. Receiving a mode signal 146 from the operation panel 22, the system controller 20 not only sets a photo or still picture mode or a movie mode in the digital camera 10, but also conditions the camera 10 for recording and playback as well as the RAW mode. The system controller 20 then causes the image pickup section 14 to effect photometry in response to the mode signal 146 and a trigger signal 148 output from a shutter release butter, not shown, and defining an image pickup timing. Image data 64 resulting from the photometry are corrected by the signal processor 18 and then fed to the system controller 20 as image data 100.

The broad dynamic range decision circuit 144 includes an arithmetic circuit for calculating a lens opening and a shutter speed, although not shown specifically. The broad dynamic range decision circuit 144 uses the input image data 100 to calculate a luminance distribution to thereby produce a photometry evaluation value, which is representative of either one of a simple accumulated value and the value resultant from an evaluation function. The photometry evaluation value is used to determine the characteristic of a scene being picked up. Subsequently, the broad dynamic range decision circuit 144 compares the photometric evaluation value with a predetermined threshold value in order to determine whether or not to execute dynamic range broadening for the lens opening and the shutter speed of a specific scene to be captured.

While the broad dynamic range decision circuit 144 is shown as being included in the system controller 20 in FIG. 1, it may be built in the signal processor 18, if desired. In such an alternative case, the signal processor 18 will deliver the accumulated value 100 produced by calculation to the system controller 20 in place of the image data 100.

The system controller 20 generates control signals 150 and 152 as well as the control signal 98 mentioned previously in accordance with the lens opening, shutter speed and the result of decision output from the broad dynamic range decision circuit 144. Further, the system controller 20 generates the control signals 98, 150 and 152 in accordance with the read-out control mode applied to the individual photo-sensitive cell 42, i.e. independent or mixed read-out control mode. The control signals 98, 150 and 152 are fed to the signal processor 18, timing signal generator 24 and driver 26, respectively. The control signal 98 should preferably be generated in consideration of line interpolation, signal generator control and signal processing executed in the signal processor 18 as well. The system controller 20 additionally controls the preprocessor 16 and the writing and reading of the storage 30.

The control panel 22 includes a mode selecting section and the shutter release button mentioned previously, although not shown specifically. The mode selecting section allows the user to select the photo or the movie mode, select the record or the playback mode, and select the ordinary processing mode or the RAW mode in relation to the above modes selected. The mode signal 146 representative of the result of such selection is applied to the signal processor 18 and system controller 20. It is to be noted that the mode signal 146 does not have to be fed to the signal processor 18 if the mode switches 92 through 96, FIG. 3, are absent.

The shutter release button is depressed stepwise into its first stroke (S1) and then into its second stroke (S2) deeper than the first stroke. The first stroke conditions the digital camera 10 for preliminary pickup while the second stroke conditions it for actual pickup. The trigger signal 148 input to the system controller 20 is representative of the above strokes of the shutter release button. The control panel 22 may additionally include a zoom switch and direction buttons that allow the user to select desired display conditions available with the monitor 28.

The timing signal generator 24 generates a timing signal 154 on the basis of a clock signal, not shown, fed from the signal processor 18 and applies the timing signal 154 to the driver 26 in response to the control signal 150 fed from the system controller 20. The timing signal includes a vertical and a horizontal sync signal, field shift pulses, a vertical and a horizontal transfer signal and electronic shutter drive pulses. The timing signal generator 24 generates the CDS pulses 60, conversion clock pulses 62 and so forth stated earlier as well.

In the illustrative embodiment, to accomplish the read-out of signal charges appropriately to dynamic range broadening or usual processing, the timing signal generator 24 outputs the field shift pulses at the same timing in the mixed read-out mode or at different timings in the independent read-out mode.

The driver 26 includes a drive circuit, not depicted, for generating the drive signals 32, 34, 36 and 56 in response to the timing signal 154 and control signal 152. More specifically, the driver 26 feeds the optical lenses and diaphragm control mechanism, included in the optics 12, with the respective drive signals, based on the control signal 152, causing them to perform AF and AE controls. Also, the driver 26 feeds the drive signal 36 to the mechanical shutter when the shutter release button is pressed by its second stroke for actual pickup, thereby opening and then closing the mechanical shutter. Further, the driver 26 delivers the drive signal 56 based on the timing signal 154 to the image sensor 40. In response, signal charges are stored in the main region 48 and sub-region 50 of each photo-sensitive cell 42 over an exposure period, read out to the vertical transfer register 40, FIG. 2, together or one after the other dependently upon the control matching with the conditions stated earlier, transferred to a horizontal transfer register, not shown, and then output as an analog voltage signal 58 via an output amplifier not shown.

The monitor 28 is generally implemented by a liquid crystal display (LCD) monitor that includes an LCD controller, not illustrated. The LCD controller causes the LCD monitor to display an image represented by the image data 104 on the basis of switching control. The LCD monitor may, of course, be replaced with any other suitable display device that is miniature, allows the user to view an image, and advantageously consumes a minimum of electric power.

The storage 30 includes a semiconductor memory, optical disk, magneto-optical disk or similar conventional recording medium in which the image data 102 output from the signal processor 18 can be written. The storage 30 selectively writes in or reads out image data to or from the recording medium with a record/playback head or transducer, i.e. a pickup or a combination of a pickup with a magnetic head suitable for the recording medium applied. This operation of the storage 30 is controlled by the system controller 20.

In the illustrative embodiment, the circuitry shown in FIG. 3 replaces part of, among the high- and low-sensitivity pixel data generated in the Raw mode, the high-sensitivity pixel data with data processed on the basis of the map data for thereby omitting the low-sensitivity pixel data corresponding to that part of the high-sensitivity pixel data. With this configuration, the illustrative embodiment can reduce the amount of the high- and low-sensitivity pixel data to be recorded in the RAW mode without any loss. Further, by so reducing the amount of data to be recorded in the RAW mode, it is possible to reduce the interval between consecutive shots in the RAW mode, i.e. in a continuous shoot mode, depending on the scene to be picked up. It should be noted that in the illustrative embodiment the data replaced with the map data mentioned above are comparable with the high-sensitivity pixel data, so that replacement will not necessary in the following steps.

A specific RAW mode recording operation of the digital camera 10 will be described hereinafter. FIG. 5 shows specific numerical values entered in part of the photo-sensitive cells 42 and representative of an image in which the quantity or intensity of the light 15 incident to the image sensor 40 increases from the left end to the right end little by little in the figure, the left end being a black level. Sated another way, FIG. 5 shows specific amounts of signal charges generated by the photo-sensitive cells 42 each consisting of the main and sub-regions 48 and 50 in digital expression for convenience. In FIG. 5, each-block surrounded by thick lines is representative of a single photo-sensitive cell 42; numerical values at the top and bottom are representative of high- and low-sensitivity pixel data, respectively.

The high-sensitivity pixel data are read out from the main regions 48 of the photo-sensitive cells 42 and then written to the image memory 66 via the preprocessor 16. At this instant, the image memory 66 is enabled to write by the control signal 98. FIG. 6A shows the high-sensitivity pixel data thus written to the image memory 66. Thereafter, the image memory 66 is disenabled. Subsequently, the low-sensitivity pixel data are read out from the sub-regions 48 of the photo-sensitive cells 42 and then written to the image memory 68 via the preprocessor 16. At this instant, the image memory 68 is enabled to write by the control signal 98. FIG. 6B shows the low-sensitivity pixel data thus written to the image memory 68.

In the RAW mode recording operation, the mode switch 94 is turned on in response to the switching signal 112 while the mode switches 92 and 96 are turned off in response thereto. After the mode switch 94 has been so turned on, the image memories 66 and 68 both are enabled to read by the control signal 98 with the result that the high- and low-sensitivity data are read out one by one while being associated with each other as to pixel, i.e. in pairs. At this instant, the low-sensitivity decision section 88 and compander 84 are enabled by the control signal 98.

The high- and low-sensitivity pixel data thus sequentially read out from the image memories 66 and 68 in one-to-one correspondence are input to the low-sensitivity decision section 88. In this section 88, the arithmetic circuit 120 multiplies the individual low-sensitivity pixel data by the sensitivity correction coefficient, which is "4" in the illustrative embodiment, to there by calculate high-sensitivity pixel data that would be obtained if the low-sensitivity pixel data presented high sensitivity. FIG. 7 shows the resulting products output from the arithmetic circuit 120 as data 132. The data 132 are input to the data decision circuit 116. Also input to the data decision circuit 116 are the high- and low-sensitivity data 134 and 136 read out from the image memories 66 and 68, respectively. The data decision circuit 116 compares the high-sensitivity pixel data 134 with the data 132.

More specifically, the data decision circuit 116 produces a difference between the high-sensitivity pixel data 134 and the data 132 pixel by pixel and then compares the absolute value of the difference with the predetermined threshold value. If the absolute value is equal to or smaller than the threshold value, the data decision circuit 116 determines that the low-sensitivity pixel data are reproducible from the high-sensitivity pixel data and delivers only the map data ZERO to the terminal 140 of the compander 140. If the absolute value is greater than the absolute value, the data decision circuit 116 determines that the low-sensitivity data are not reproducible from the high-sensitivity pixel data, generates the map data ONE, and feeds the map data ONE to the terminal 140 of the compander 84.

Comparing the high-sensitivity pixel data of FIG. 6A with the data 132 of FIG. 7, it will be seen that the pixel data lying in a block 156, indicated by a thick line in FIG. 6A, and the pixel data lying in a block 158, indicated by a thick line in FIG. 7, are extremely close to each other. FIGS. 8A, 8B and 8C respectively show the high-sensitivity pixel data 134, the low-sensitivity pixel data and the map data, of which the latter two are output from the data decision circuit 116 as data 138. While the products of the low-sensitivity pixel data and sensitivity correction coefficient may be recorded in accordance with the embedding condition, the illustrative embodiment records all high-sensitivity pixel data 134 as basic data and therefore makes embedding processing unnecessary. The compander 84 may simply pass the high-sensitivity pixel data 134 and the data 138 therethrough or execute reversible compression with the map data included in the data 138. The compander 84 stores the high-sensitivity image data 134 and the data 138 in the storage 30 in the form of a single file.

With the recording procedure described above, it is possible to reduce the amount of low-sensitivity pixel data linearly related in sensitivity to high-sensitivity pixel data and therefore the amount of raw data to be recorded in the storage 30. The compander 84 may apply run-length coding to the map data in order to reduce the amount of record data to be recorded.

How data recorded in the storage 30 are reproduced will be described hereinafter. The user of the digital camera 10 selects a playback mode on the mode selecting section of the operation panel. In response, the operation panel 22 sends out the switching signals 106 and 122 to the mode switches 92 and 96, respectively, for thereby turning them on. The mode switch 94 is turned off with the switching signal 112.

Subsequently, a file recorded in the storage 30 is read out and applied to the compander 84 as data 102. The compander 84 determines whether or not the data of the file 102 are recorded in the RAW mode. If the answer of this decision is positive, the compander 84 delivers status data representative of the RAW mode to the system controller 20. In response, the system controller 20 sends out a switching signal 106 that turns off the mode switch 92 to the mode switch 92. If the answer of the above decision is negative, meaning that the data of the file 102 are recorded in the usual mode different from the RAW mode then the compander 84 sends out status data representative of the usual reproduction processing to the system controller. In response, the system controller 20 feeds a switching signal 122 that turns off the mode switch 96 to the mode switch 96.

More specifically, if the data 102 input to the compander 84 are recorded in the RAW mode, then the compander 84 expands the map data included in the data 102 and reversibly compressed. The compander 84 then feeds the high-sensitivity data 134, FIG. 8A, and data 138 made up of the low-sensitivity data 138, FIG. 8B, and map data 138, FIG. 8C, to the data generator 90. In this case, only the compander 84 and data generator 90 are enabled by the control signal 98 beforehand.

The data generator 90 divides the high-sensitivity pixel data input thereto by the sensitivity correction coefficient, which corrects the sensitivity of each sub-region 50 to the sensitivity of the main region 48, thereby calculating low-sensitivity pixel data substantially linearly related in sensitivity to the high-sensitivity pixel data. Subsequently, the data generator 90 separates, among the low-sensitivity pixel data thus calculated, pixel data actually linearly related on the basis of the map data, i.e. pixel data represented by the map data ZERO in FIG. 8C. The low-sensitivity pixel data of FIG. 8B are combined pixel by pixel with the pixel data separated on the basis of the map data ZERO of FIG. 8C. FIG. 9 shows low-sensitivity pixel data 136 restored by such a procedure.

As stated above, in the illustrative embodiment, when pixel data derived from a plurality of regions of each photo-sensitive cell 42 are to be recorded in the RAW mode, pixel data linearly related to sensitivity are converted to map data while being determined whether or not they are reproducible. Subsequently, recorded are low-sensitivity pixel data not reproducible, high-sensitivity pixel data which are the basis of reproduction, and map data. This successfully reduces the amount of record data. Further, at the time of playback, it is possible to reproduce low-sensitivity pixel data by assigning them to the positions of the low-sensitivity pixel data produced by correcting the high-sensitivity pixel data, which correspond to the map data ZEROs, and non-reproducible low-sensitivity pixel data.

FIG. 10 shows another specific configuration of the signal processor 18 representative of an alternative embodiment of the present invention. Because the circuitry shown in FIG. 10 is essentially similar to the circuitry shown in FIG. 3, like structural parts and elements are designated by identical reference numerals and will not be described specifically in order to avoid redundancy.

Briefly, the alternative embodiment may be the same as the previous embodiment except that the alternative embodiment uses low-sensitivity pixel data as basic data in place of high-sensitivity pixel data. The illustrative embodiment has the advantage of being practicable with a smaller number of circuit wirings than the signal processor of FIG. 3. More specifically, the input terminals 110 and 140 of the compander 84 are integrated into a single input terminal 110, so that the number of input terminals of the data generator 90 is reduced to one. Further, the data generator 90 is connected to the input terminal 124 of the mode switch 96 so as to receive high-sensitivity pixel data.

In operation, low-sensitivity pixel data 136 shown in FIG. 11A are input to the arithmetic circuit 120 included in the low-sensitivity decision section 88. In response, the arithmetic circuit 120 multiplies the individual low-sensitivity pixel data 136 by the preselected sensitivity correction coefficient to thereby produce corrected data 132 shown in FIG. 10. The corrected data 132 are fed to the data decision circuit 116. The data decision circuit 116 compares the corrected data 132 with high-sensitivity pixel data 134 shown in FIG. 10. More specifically, the data decision circuit 116 produces the absolute value of a difference between each corrected data 132 and high-sensitivity pixel data 134 corresponding in pixel position thereto and then compares the absolute value with a preselected threshold value. Subsequently, the data decision circuit 116 assigns the map data ZERO to pixels where the absolute value is equal to or smaller than the threshold value while assigning the map data ONE to the other pixels. More specifically, it will be seen that the portion 162 of the corrected data 132, FIG. 11B, and the portion 164 of the high-sensitivity pixel data 134, FIG. 11C, are almost close to each other in value.

Using the low-sensitivity pixel data 136 as basic data, the data decision circuit 116 generates data 138 made up of record data and map data and delivers them to the compander 84. As shown in FIG. 12A, the record data are such that the corrected data of FIG. 11B are assigned to the pixel positions where the map data shown in FIG. 12B is ZERO while the low-sensitivity pixel data of FIG. 11A are assigned to the pixel positions where the map data show ONE. In this manner, the record data are recorded on the basis of the low-sensitivity pixel data and therefore smaller in amount than the high-sensitivity pixel data of the circuitry shown in FIG. 3. More specifically, the illustrative embodiment halves the amount of record data without regard to the kind of a scene, compared to the case wherein high- and low-sensitivity pixel data both are recorded. The amount of record data particular to the illustrative embodiment is substantially the same as the amount of data obtainable with whole or undivided photo-sensitive cells in the RAW mode and is therefore advantageous when RAW mode recording is effected with divided photo-sensitive cells.

The data decision circuit 116 feeds the data 138 to the compander 84. This is followed by the same processing as executed in the previous embodiment. With this configuration, the illustrative embodiment realizes, in the RAW mode recording operation, a time interval between shots in the continuous shoot mode as short as one achievable with undivided photo-sensitive cells.

The illustrative embodiment reproduces high- and low-sensitivity pixel data on the basis of data recorded in the RAW mode, as will be described hereinafter. The main and sub-regions 48 and 50 of each photo-sensitive cell 42 are formed of the same material, and each is provided with particular sensitivity based on its effective photosensitive area. Therefore, when a given quantity of light 15 is incident to the photo-sensitive cell 42, a particular signal charge is produced from each of the main and sub-regions 48 and 50 in dependence upon the area. Map data are derived from such a relation between the main and sub-regions 48 and 50 of the photo-sensitive cell 42 and allow high- and low-sensitivity data to be reproduced.

More specifically, the compander 84 delivers expanded data 138 to the data generator 90. FIG. 13A shows record data input to the data generator 90. The data generator 90 multiplies the individual low-sensitivity pixel data, which lie in a portion 166 where the map data show ONE shown in FIG. 12B, by the sensitivity correction coefficient, i.e. "4" in the illustrative embodiment. FIG. 13B shows record data thus produced from the low-sensitivity pixel data by multiplication. Subsequently, the data generator 90 replaces, among the numerical values shown in FIG. 13B, numerical values greater than the maximum value, e.g. "4095", represented by a predetermined number of, e.g. twelve, bits to be dealt with by the illustrative embodiment with that maximum value. Let this replacement be referred to as "bit overflow processing" hereinafter. FIG. 14 shows high-sensitivity pixel data reproduced by such bit overflow processing with data in the portion 166 replaced with the system maximum value.

As for low-sensitivity pixel data, pixel data lying in a range 168 of FIG. 15B are divided by the sensitivity correction coefficient on the basis of map data ZEROs shown in FIG. 15A. FIG. 15C shows low-sensitivity pixel data thus reproduced.

With the configuration described above, the illustrative embodiment is capable of reducing the amount of record data more extensively than the previous embodiment and reproducing data in accordance with such recording.

The signal processor 18 with the configuration shown in FIG. 10 may execute alternative record processing that allows the arithmetic circuit 120 of the low-sensitivity decision section 88 to be omitted, as will be described hereinafter. The arithmetic circuit 120 feeds the data 132 for generating map data to the data decision circuit 116. In response, the data decision circuit 116 generates record data on the basis of high-sensitivity pixel data shown in FIG. 16A and low-sensitivity pixel data shown in FIG. 16B.

More specifically, the data decision circuit 116 generates record data shown in FIG. 16C by replacing saturated high-sensitivity pixel data, which lie in a portion 170 of FIG. 16A, with low-sensitivity pixel data lying in a portion 172 of FIG. 16B that corresponds to the portion 170. Further, the data decision circuit 116 compares the data 132 with the high-sensitivity data to thereby produce map data, as stated previously. Subsequently, the record data and map data are fed from the data decision circuit 116 to the compander 84 as data 138 and then written to the storage 30. Such an alternative procedure available with the illustrative embodiment is also successful to halve the amount of data recorded in the RAW mode without regard to a scene captured, compared to the case wherein high- and low-sensitivity pixel data are directly recorded together.

On the other hand, data read out from the storage 30 are delivered to the data generator 90 via the compander 84 as record data and map data (138) shown in FIGS. 16C and 16D, respectively. In response, the data generator 90 maintains part of the record data represented by the map data ZEROs of FIG. 16D, but makes the other record data represented by the map data ONEs blank, see a block 174 shown in FIG. 17A. Subsequently, the data generator 90 inserts the greatest value of the preselected number of bits, i.e. the saturation value into the blank block 174, thereby reproducing high-sensitivity pixel data.

Further, the data generator 90 uses record data and map data 138 shown in FIGS. 18A and 18B, respectively, to reproduce low-sensitivity pixel data. More specifically, the data generator 90 divides record data represented by the map data ZEROs by the sensitivity correction coefficient as in the processing stated earlier. FIG. 18C shows the resulting low-sensitivity pixel data. In this manner, pixel data derived from the main and sub-regions 48 and 50 of each photo-sensitive cell 42 can be accurately reproduced on the basis of map data.

While the illustrative embodiments have concentrated on a digital camera operable in both of a record mode and a playback mode, the present invention is, of course, also applicable to an image recording apparatus or an image reproducing apparatus having only a recording function or a reproducing function, respectively.

As stated above, in the digital camera 10 in accordance with the present invention, the arithmetic circuit 120 of the low-sensitivity decision section 88 executes, in the RAW mode recording operation, sensitivity correction with low-sensitivity pixel data and delivers the resulting corrected data to the data decision circuit 116. By comparing the corrected data with high-sensitivity pixel data, the data decision circuit 116 generates map data pixel by pixel, omits the pixel data in accordance with the map data and an embedding condition in basic data set beforehand, and then outputs record data and map data 138 thus generated. With the resulting high- and low-sensitivity pixel data, as distinguished from pixel raw data simply derived from a single photo-sensitive cell, it is possible to noticeably reduce, despite that the number of data is substantially doubled due to the generation of high- and low-sensitivity pixel data, the amount of recording to be actually recorded in a recording medium in accordance with the relation between the two kinds of pixel data. It is therefore possible to reduce the interval between consecutive shots.

The data decision circuit 116 produces the absolute value of a difference between a product output from the arithmetic circuit 120 and high-sensitivity pixel data input thereto and compares the absolute value with a preselected threshold value to there by generate bi-level data. This allows a relation between high- and low-sensitivity pixel data derived from a single photo-sensitive cell to be determined.

In a specific configuration, the data decision circuit 116, using high-sensitivity pixel data as basic data, applies an embedding condition for embedding related data in pixels where the absolute value of the difference is equal to or smaller than the threshold value, thereby omitting low-sensitivity pixel data meeting the embedding condition, i.e. outputting only the basic data, low-sensitivity pixel data left and map data. While the products of the low-sensitivity pixel data and sensitivity correction coefficient may be recorded, depending on the embedding condition, embedding processing may be omitted because all high-sensitivity pixel data 134 are recorded as basic data.

In another specific configuration, the data decision circuit 116, using low-sensitivity pixel data as basic data and using the embedding condition mentioned above, generates record data in which high-sensitivity pixel data meeting to the above embedding condition are embedded in the corresponding pixel positions of the basic data, thereby outputting the record data and map data. Alternatively, by using high-sensitivity pixel data as basic data and selecting an embedding condition that a level be higher than the saturation of the basic data, the data decision circuit 116 may embed low-sensitivity pixel data in pixel positions meeting to the embedding condition to thereby generate record data and output the record data and map data. In any case, it is possible to halve the number of data to be recorded without regard to the kind of a scene, compared to the case wherein high- and low-sensitivity pixel data are both recorded.

The digital camera 10 may not feed high- and low-sensitivity pixel data to the low-sensitivity decision section 88 at the same timing, but may feed them at different timings so long as the relation between pixels can be preserved.

In the signal processor 18, the data generator 90, receiving record data and map data recorded in the RAW mode, executes reproduction or restoration processing with at least one of high- and low-sensitivity pixel data in accordance with the value of the map data, thereby reproducing the entire raw pixel data without any loss.

In a specific configuration, the data generator 90 divides, among the high-sensitivity pixel data used as basic data, the high-sensitivity pixel data corresponding to map data ZERO meeting the embedding condition by the sensitivity correction coefficient, thereby generating low-sensitivity pixel data corresponding to the high-sensitivity pixel data. The low-sensitivity data thus generated are combined with the rest of the low-sensitivity pixel data so as to reproduce low-sensitivity pixel data. This is also successful to reproduce high- and low-sensitivity pixel data without any loss.

In another specific configuration, receiving the record data and map data, the data generator 90 multiplies the record data corresponding to, among the map data, map data ONE showing that the absolute value of the difference is greater than a preselected threshold value by the sensitivity correction coefficient and then assigns the maximum value of a preselected number of bits to all products greater than the maximum value (overflow processing). As a result, the record data corresponding to, among the map data, map data ZERO showing that the absolute value of the difference is equal to or smaller than a threshold pixel are combined with the result of assignment, whereby high-sensitivity pixel data are restored. Further, the data generator 90 divides the record data corresponding to the above map data ZERO by the sensitivity correction coefficient. The resulting quotients and the record data corresponding to map data ONE showing that the absolute value is greater than a preselected threshold, i.e. the basic data are combined to restore low-sensitivity pixel data. This is also successful to reproduce high- and low-sensitivity pixel data without any loss.

Further, receiving record data and map data, the data generator 90 assigns the maximum value of a preselected number of bits to, among the map data, map data ONE showing that the embedding condition is satisfied and then combines the result of assignment and the rest of the record data for thereby restoring high-sensitivity pixel data. Also, the data generator 90 combines the record data corresponding to the above map data ONE and quotients produced by dividing record data showing that the embedding condition is not satisfied by the sensitivity correction coefficient, thereby restoring low-sensitivity pixel data. This is also successful to reproduce high- and low-sensitivity pixel data without any loss.

In accordance with an image recording method of the present invention, among pixel data derived from a single pixel, at least one of high- and low-sensitivity pixel data lower in sensitivity than the high-sensitivity pixel data is omitted. In that omitting step, the low-sensitivity pixel data are multiplied by a sensitivity correction coefficient selected beforehand for making the low-sensitivity data comparable with the high-sensitivity pixel data. Subsequently, the absolute value of a difference between the resulting product and the high-sensitivity pixel data is produced and compared with a preselected threshold value to thereby generate map data showing whether or not a pixel subject to comparison lies in a reproducible range with respect to the preselected threshold value. Further, either one of the high- and low-sensitivity pixel data is selected as basic data so as to omit or embed pixel data in accordance with an embedding condition in the basic data and the map data, whereby record data are generated. Finally, the record data and map data are output. Therefore, despite that the number of data is substantially doubled due to the generation of high- and low-sensitivity pixel data, compared to the case wherein single raw pixel data are simply produced form a single photo-sensitive cell, the method of the present invention noticeably reduces the actual amount of recording in a recording medium in accordance with the relation between the two different pixel data, thereby reducing the interval between consecutive shots.

Further, the method of the present invention uses the high-sensitivity pixel data as the basic data and assumes that the embedding condition is that the absolute value of the difference be smaller than a preselected threshold value. Among the low-sensitivity pixel data, the low-sensitivity pixel data meeting the above embedding condition are omitted. Finally, the basic data, low-sensitivity pixel data left after deletion and map data are output. Consequently, the amount of recording can be reduced although the reduction depends on the scene, compared to the case where in high-and low-sensitivity pixel data both are recorded.

Further, the method of the present invention uses the low-sensitivity pixel data as the basic data and assumes that the embedding condition is that the absolute value of the difference be equal to or smaller than a preselected threshold value. Record data in which the high-sensitivity pixel data meeting the embedding condition are embedded in corresponding pixel positions of the basic data are generated. Finally, the record data and map data are output. Alternatively, the high-sensitivity pixel data may be used as the basic data, and the embedding condition may be such that a level be equal to or higher than the saturation level of the basic data. In such a case, record data in which the low-sensitivity pixel data meeting the embedding condition are embedded in corresponding pixel positions of the basic data are generated, and the record data and map data are output. This successfully halves the amount of recording without regard to the scene, compared to the case wherein the pixel data of two different kinds both are recorded.

In the method of recording image data, each of the high- and low-sensitivity pixel data may be fed at a particular timing, if desired.

In accordance with an image reproducing method for the digital camera 10 and matched to the above image recording method, after the record data and map data have been read out, reproduction processing is executed with at least one of the high- and low-sensitivity pixel data in accordance with the values of the map data. The method can therefore restore the entire high- and low-sensitivity pixel data without any loss.

In accordance with the above image reproducing method, among the high-sensitivity pixel data used as the basic data in the event of recording, the high-sensitivity pixel data meeting the embedding condition are divided by the sensitivity correction coefficient to thereby generate low-sensitivity pixel data corresponding to the high-sensitivity pixel data. The low-sensitivity pixel data thus generated and the low-sensitivity pixel data recorded in the event of recording are combined to almost perfectly restore the low-sensitivity pixel data existed before recording. Consequently, substantially complete low-sensitivity pixel data can be restored without any loss.

Further, record data corresponding to, among the map data input together with the record data, map data ONE showing that the absolute value of the difference are greater than a preselected threshold value are multiplied by the sensitivity correction coefficient. Subsequently, the maximum value of a preselected number of bits is assigned to all the resulting products greater than the maximum value, and the record data corresponding to, among the map data, map data ZERO showing that the absolute value of the difference is equal to or smaller than a preselected threshold pixel and the results of assignment are combined to reproduce the high-sensitivity pixel data. Also, the record data corresponding to the above map data ZERO are divided by the sensitivity correction coefficient, and the resulting quotients and record data corresponding to map data ONE showing that the absolute value of the difference is greater than the preselected threshold value are combined to reproduce the low-sensitivity pixel data.

Moreover, assigning the maximum value of preselected bits to, among the map data input together with the record data, map data ONE showing that the embedding condition is satisfied, and the result of assignment and the other record data are combined to reproduce the high-sensitivity pixel data. Also, the low-sensitivity data are reproduced by combining the record data corresponding to, among the map data, map data ONE showing that the embedding condition is satisfied and quotients produced by dividing the record data corresponding to map data ZERO showing that the embedding condition is not satisfied by the sensitivity correction coefficient.

While the image reproducing method of the present invention stated above lacks an image recording device, it is, of course, also applicable to an image reproducing device based on image recording conditions.

The entire disclosure of Japanese patent application No. 2004-026226 filed on Feb. 3, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pickup apparatus comprising:
    a solid-state image sensor comprising an array of photo-sensitive cells bi-dimensionally arranged for converting incident light to a corresponding signal charge, each of the photo-sensitive cells including a main region and a sub-region lower in sensitivity than the main region; and
    a signal processor for receiving the signal charges from the photo-sensitive cells and processing pixel data represented by the signal charges to output the pixel data processed as recording data;
    said signal processor comprising a RAW data reducing circuit for compressing, in a RAW mode for recording raw pixel data, at least one of high-sensitivity pixel data and low-sensitivity pixel data output from the main region and the sub-region, respectively;
    said RAW data reducing circuit comprising:
    an arithmetic circuit for multiplying the low-sensitivity pixel data by a predetermined sensitivity correction coefficient that makes sensitivity of the low-sensitivity pixel data comparable with sensitivity of the high-sensitivity pixel data to output a produce resultant from multiplication; and
    a data decision circuit for comparing the product with the high-sensitivity pixel data, and using either one of the high-sensitivity pixel data and the low-sensitivity pixel data as basic data to omit and embed pixel data in accordance with an embedding condition for embedding processed data in the basic data to generate the recording data.

2. The apparatus in accordance with claim 1, wherein said data decision circuit generates, as part of the recording data, an absolute value of a difference between the product and the high-sensitivity pixel data, and compares the absolute value with a predetermined threshold value to thereby determine whether or not a pixel subject to comparison lies in a reproducible range with respect to the threshold value and generate results of decision made on the embedding condition in a form of bi-level data.

3. The apparatus in accordance with claim 1, wherein said data decision circuit uses the high-sensitivity pixel data as the basic data, and uses as the embedding condition the absolute value of the difference being equal to or smaller than the predetermined threshold value to omit the low-sensitivity pixel data meeting the embedding condition, and
    said RAW data reducing circuit outputs the basic data, the low-sensitivity pixel data left after omission and results of decision on the embedding condition.

4. The apparatus in accordance with claim 2, wherein said data decision circuit uses the high-sensitivity pixel data as the basic data, and uses as the embedding condition the absolute value of the difference being equal to or smaller than the predetermined threshold value to omit the low-sensitivity pixel data meeting the embedding condition, and
    said RAW data reducing circuit outputs the basic data, the low-sensitivity pixel data left after omission and results of decision on the embedding condition.

5. The apparatus in accordance with claim 1, wherein said data decision circuit uses the low-sensitivity pixel data as the basic data, and uses as the embedding condition the absolute value of the difference being equal to or smaller than the predetermined threshold value to generate the recording data in which the high-sensitivity pixel data meeting the embedding condition are embedded in corresponding pixel positions of the basic data, and
    said RAW data reducing circuit outputs the recording data and results of decision on the embedding condition.

6. The apparatus in accordance with claim 2, wherein said data decision circuit uses the low-sensitivity pixel data as the basic data, and uses as the embedding condition the absolute value of the difference being equal to or smaller than the predetermined threshold value to generate the recording data in which the high-sensitivity pixel data meeting the embedding condition are embedded in corresponding pixel positions of the basic data, and
    said RAW data reducing circuit outputs the recording data and results of decision on the embedding condition.

7. The apparatus in accordance with claim 1, wherein said data decision circuit uses the high-sensitivity pixel data as the basic data, and uses as the embedding condition a level being equal to or higher than a saturation level of the basic data to embed the low-sensitivity pixel data in pixel positions meeting the embedding condition to thereby generate recording data, and
    said RAW data reducing circuit outputs the recording data and results of decision on the embedding condition.

8. The apparatus in accordance with claim 2, wherein said data decision circuit uses the high-sensitivity pixel data as the basic data, and uses as the embedding condition a level being equal to or higher than a saturation level of the basic data to embed the low-sensitivity pixel data in pixel positions meeting the embedding condition to thereby generate recording data, and
    said RAW data reducing circuit outputs the recording data and results of decision on the embedding condition.

9. The apparatus in accordance with claim 1, wherein said RAW data reducing circuit is fed with the high-sensitivity pixel data and the low-sensitivity pixel data each at respective particular timings.

10. The apparatus in accordance with claim 2, wherein said RAW data reducing circuit is fed with the high-sensitivity pixel data and the low-sensitivity pixel data each at respective particular timings.

11. The apparatus in accordance with claim 4, wherein said RAW data reducing circuit is fed with the high-sensitivity pixel data and the low-sensitivity pixel data each at respective particular timings.

12. The apparatus in accordance with claim 6, wherein said RAW data reducing circuit is fed with the high-sensitivity pixel data and the low-sensitivity pixel data each at respective particular timings.

13. The apparatus in accordance with claim 8, wherein said RAW data reducing circuit is fed with the high-sensitivity pixel data and the low-sensitivity pixel data each at respective particular timings.

14. The apparatus in accordance with claim 1, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

15. The apparatus in accordance with claim 2, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

16. The apparatus in accordance with claim 4, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

17. The apparatus in accordance with claim 6, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

18. The apparatus in accordance with claim 8, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

19. The apparatus in accordance with claim 13, wherein said signal processor includes a RAW data restoring circuit for receiving the recording data recorded in the RAW mode and the results of decision on the embedding condition, and restoring at least one of the high-sensitivity pixel data and the low-sensitivity pixel data in accordance with the results of decision for thereby reproducing all raw image data.

20. The apparatus in accordance with claim 19, wherein said RAW data restoring circuit divides, among the high-sensitivity pixel data used as the basic data, the high-sensitivity pixel data meeting the embedding condition by the sensitivity correction coefficient for thereby generating low-sensitivity pixel data corresponding to the high-sensitivity pixel data, and combines the low-sensitivity pixel data generated with the low-sensitivity pixel data left after omission for thereby reproducing the low-sensitivity pixel data.

21. The apparatus in accordance with claim 19, wherein said RAW data restoring circuit receives the recording data and the results of decision on the embedding condition, multiplies the recording data corresponding to, among the results of decision, the results showing that the absolute value is greater than the predetermined threshold value by the sensitivity correction coefficient, and assigns a maximum value represented by a predetermined number of bits to all results of multiplication greater than the maximum value, said RAW data restoring circuit combining the recording data corresponding to, among the results of decision, the results showing that the absolute value is equal to or smaller than a predetermined threshold pixel with a result of assignment of the maximum value to restore the high-sensitivity pixel data, said RAW data restoring circuit dividing the recording data corresponding to, among the results of decision on the embedding condition, the results of decision showing that the absolute value of the decision is equal to or smaller than the threshold pixel by the sensitivity correction coefficient, and combining results of division with the recording data corresponding to the results of decision showing that the absolute value of the difference is greater than the predetermined threshold value to restore the low-sensitivity pixel data.

22. The apparatus in accordance with claim 19, wherein said RAW data restoring circuit receives the recording data and the results of decision on the embedding condition, assigns a maximum value represented by a predetermined number of bits to, among the results of decision, the results of decision showing that the embedding condition is satisfied, and combines a result of assignment with the other recording data to restore the high-sensitivity pixel data, and said RAW data restoring circuit divides the recording data corresponding to, among the results of decision, the results of decision showing that the embedding condition is not satisfied by the sensitivity correction coefficient, and combines results of division with the recording data corresponding to the results of decision showing that the embedding condition is satisfied for thereby restoring the low-sensitivity pixel data.

23. An image recording method for a solid-state image pickup apparatus of recording as raw data pixel data derived from pixels, each of which produces pixel data with different sensitivity, comprising a first step of omitting, among the pixel data derived from each of the pixels, at least one of high-sensitivity pixel data and low-sensitivity pixel data lower in sensitivity than said high-sensitivity pixel data;

said first step comprising:

a first sub-step of multiplying the low-sensitivity pixel data by a sensitivity correction coefficient selected beforehand for making the low-sensitivity pixel data comparable with the high-sensitivity pixel data;

a second sub-step of producing an absolute value of a difference between a result of multiplication and the high-sensitivity pixel data, and comparing the absolute value with a predetermined threshold value to thereby generate map data showing whether or not a pixel subject to comparison lies in a reproducible range with respect to the predetermined threshold value;

a third sub-step of selecting either one of the high-sensitivity pixel data and the low-sensitivity pixel data as basic data, and omitting and embedding pixel data in accordance with an embedding condition in the basic data and the map data for thereby generating recording data; and a fourth sub-step of outputting the recording data and the map data.

24. The method in accordance with claim 23, wherein, in said third sub-step, the high-sensitivity pixel data are used as the basic data, and the embedding condition is used that the absolute value of the difference be equal to or smaller than a predetermined threshold value to omit, among the low-sensitivity pixel data, the low-sensitivity pixel data meeting the embedding condition, and in said fourth sub-step, the basic data, the low-sensitivity pixel data left after omission and the map data are output.

25. The method in accordance with claim 23, wherein, in said third sub-step, the low-sensitivity pixel data are used as the basic data, and the embedding condition is used that the absolute value of the difference be equal to or smaller than a predetermined threshold value to generate recording data in which the high-sensitivity pixel data meeting the embedding condition are embedded in corresponding pixel positions of the basic data, and in the fourth sub-step, the recording data and the map data are output.

26. The method in accordance with claim 23, wherein, in said third sub-step, the high-sensitivity pixel data are used as the basic data, and the embedding condition is used that a level be equal to or higher than a saturation level of the basic data to generate recording data in which the low-sensitivity pixel data meeting the embedding condition are embedded in corresponding pixel positions of the basic data, and in the fourth sub-step, the recording data and the map data are output.

27. The method in accordance with claim 23, wherein, in the first step, the high-sensitivity pixel data and the low-sensitivity pixel data are fed at respective particular timings.

28. The method in accordance with claim 24, wherein, in the first step, the high-sensitivity pixel data and the low-sensitivity pixel data are fed at respective particular timings.

29. The method in accordance with claim 25, wherein, in the first step, the high-sensitivity pixel data and the low-sensitivity pixel data are fed at respective particular timings.

30. The method in accordance with claim 26, wherein, in the first step, the high-sensitivity pixel data and the low-sensitivity pixel data are fed at respective particular timings.

31. An image reproducing method of reproducing an image from image data recorded by a method for a solid-state image pickup apparatus for recording as raw data pixel data derived from pixels, each of which produces pixel data with different sensitivity, comprising a first step of omitting, among the pixel data derived from each of the pixels, at least one of high-sensitivity pixel data and low-sensitivity pixel data lower in sensitivity than said high-sensitivity pixel data;

said first step comprising:

a first sub-step of multiplying the low-sensitivity pixel data by a sensitivity correction coefficient selected beforehand for making the low-sensitivity pixel data comparable with the high-sensitivity pixel data;

a second sub-step of producing an absolute value of a difference between a result of multiplication and the high-sensitivity pixel data, and comparing the absolute value with a predetermined threshold value to thereby generate map data showing whether or not a pixel subject to comparison lies in a reproducible range with respect to the predetermined threshold value;

a third sub-step of selecting either one of the high-sensitivity pixel data and the low-sensitivity pixel data as basic data, and omitting and embedding pixel data in accordance with an embedding condition in the basic data and the map data for thereby generating recording data; and a fourth sub-step of outputting the recording data and the map data, said image reproducing method comprising a second step of reading out the recording data and the map data, and restoring, in accordance with values of the map data, at least either one of the high-sensitivity pixel data and the low-sensitivity pixel data.

32. An image reproducing method of reproducing an image from image data recorded by a method for a solid-state image pickup apparatus for recording as raw data pixel data derived from pixels, each of which produces pixel data with different sensitivity, comprising a first step of omitting, among the pixel data derived from each of the pixels, at least one of high-sensitivity pixel data and low-sensitivity pixel data lower in sensitivity than said high-sensitivity pixel data;

said first step comprising:

a first sub-step of multiplying the low-sensitivity pixel data by a sensitivity correction coefficient selected beforehand for making the low-sensitivity pixel data comparable with the high-sensitivity pixel data;

a second sub-step of producing an absolute value of a difference between a result of multiplication and the high-sensitivity pixel data, and comparing the absolute value with a predetermined threshold value to thereby generate map data showing whether or not a pixel subject to comparison lies in a reproducible range with respect to the predetermined threshold value;

a third sub-step of selecting either one of the high-sensitivity pixel data and the low-sensitivity pixel data as basic data, and omitting and embedding pixel data in accordance with an embedding condition in the basic data and the map data for thereby generating recording data; and a fourth sub-step of outputting the recording data and the map data, said image reproducing method comprising a second step of reading out the recording data and the map data, and restoring, in accordance with values of the map data, at least either one of the high-sensitivity pixel data and the low-sensitivity pixel data, in said first step, the high-sensitivity pixel data and the low-sensitivity pixel data being fed at respective particular timings.

33. The method in accordance with claim 32, wherein said second step comprises:

a fifth sub-step of dividing, among the high-sensitivity pixel data used as the basic data in recording, the high-sensitivity pixel data meeting the embedding condition by the sensitivity correction coefficient to thereby generate low-sensitivity pixel data corresponding to the high-sensitivity pixel data; and a sixth sub-step of combining the low-sensitivity pixel data generated with the low-sensitivity pixel data recorded to thereby restore the low-sensitivity pixel data before recorded.

34. The method in accordance with claim 32, wherein the second step comprises:

a fifth sub-step of inputting the recording data and mapping data, and multiplying by the sensitivity correction coefficient the recording data corresponding to, among the map data, the map data showing that the absolute value of the difference is greater than the predetermined threshold value;

a sixth sub-step of assigning a maximum value represented by a predetermined number of bits to all results of multiplication equal to or greater than the maximum value, and combining the recording data corresponding to, among the map data, the map data showing that the absolute value of the difference is equal to or smaller than a predetermined threshold pixel with results of assignment to thereby reproduce the high-sensitivity pixel data; and a seventh sub-step of dividing the recording data corresponding to, among the map data, the map data showing that the absolute value of the difference is equal to or smaller than the predetermined threshold pixel by the sensitivity correction coefficient, and combining results of division with the recording data corresponding to the map data showing that the absolute value of the difference is greater than the predetermined threshold value to thereby restore the low-sensitivity pixel data.

35. The method in accordance with claim 32, wherein the second step comprises:

a fifth sub-step of inputting the recording data and the map data, assigning a maximum value represented by a predetermined number of bits to, among the map data, the map data showing that the embedding condition is satisfied, and combining a result of assignment with the other recording data to thereby restore the high-sensitivity pixel data; and a sixth sub-step of combining the recording data corresponding to, among the map data, the map data showing that the embedding condition is satisfied with results of division produced by dividing the recording data corresponding to the map data showing that the embedding condition is not satisfied by the sensitivity correction coefficient to reproduce the low-sensitivity pixel data.

36. An image reproducing method of reading out image data for reproducing the image data, the image data being recorded by an image recording method in which, when recording pixel data derived from each of pixels with different sensitivity as raw data, omissible pixel data are omitted, the pixel data left after omission are used as recording data to be recorded together with map data each corresponding to a particular pixel and represented by bi-level data, said image reproducing method comprising:

a first step of reading out the recording data and the map data, and performing an arithmetic operation by applying to one of the pixel data of the recording data subject to comparison and different in sensitivity a sensitivity correction coefficient that makes the one pixel data comparable with other pixel data; and a second step of using one of high-sensitivity pixel data and low-sensitivity pixel data constituting the recording data as basic data, performing an arithmetic operation on at least one of the high-sensitivity pixel data and the low-sensitivity pixel data in accordance with an embedding condition for embedding related data in the other data and the map data to thereby restore omitted pixel data, and combining with omitted image data with part of the recording data to thereby restore the high-sensitivity pixel data and the low-sensitivity pixel data before recorded.

37. The method in accordance with claim 36, wherein said second step comprises:

a first sub-step of using either one of the high-sensitivity pixel data and the low-sensitivity pixel data in recording as basic data in which data should be embedded, and dividing, when the basic data comprises the high-sensitivity pixel data, part of the high-sensitivity pixel data which meets an embedding condition that the absolute value of the difference be equal to or smaller than a predetermined threshold value by the sensitivity correction coefficient to thereby generate low-sensitivity pixel data corresponding to the high-sensitivity pixel data; and a second step of combining the low-sensitivity pixel data generated with the low-sensitivity pixel data recorded to thereby restore the low-sensitivity pixel data before recorded.

38. The method in accordance with claim 36, wherein the second step comprises:

a first sub-step of inputting the recording data and mapping data, and multiplying the recording data corresponding to, among the map data, the map data showing that the absolute value of the difference is greater than the predetermined threshold value;

a second sub-step of assigning a maximum value of a predetermined number of bits to all results of multiplication greater than the maximum value, and combining the recording data corresponding to, among the map data, the map data showing that the absolute value of the difference is equal to or smaller than a predetermined threshold pixel with results of assignment to thereby restore the high-sensitivity pixel data; and a third sub-step of dividing the recording data corresponding to, among the map data, the map data showing that the absolute value of the difference is equal to or smaller than the threshold pixel by the sensitivity correction coefficient, and combining results of division with the recording data corresponding to the map data showing that the absolute value of the difference is greater than the predetermined threshold value to thereby restore the low-sensitivity pixel data.

39. The method in accordance with claim 36, wherein the second step comprises:

a first sub-step of inputting the recording data and the map data, assigning a maximum value of a predetermined number of bits to, among the map data, the map data showing that the embedding condition is satisfied, and combining a result of assignment with the other recording data to thereby restore the high-sensitivity pixel data; and a second sub-step of combining the recording data corresponding to, among the map data, the map data showing that the embedding condition is satisfied with results of division produced by dividing the recording data corresponding to the map data showing that the embedding condition is not satisfied by the sensitivity correction coefficient to restore the low-sensitivity pixel data.

* * * * *